(12) United States Patent
Weeda et al.

(10) Patent No.: US 7,703,835 B2
(45) Date of Patent: Apr. 27, 2010

(54) SECONDARY DOOR AND TEMPERATURE CONTROL SYSTEM AND METHOD

(76) Inventors: Dewey J. Weeda, 420 Schenck Ave., Dayton, OH (US) 45409; Phillip V. Weeda, 204 Hilltop Ave., Dayton, OH (US) 45419

(*) Notice: Subject to any disclaimer, the term of this patent is extended or adjusted under 35 U.S.C. 154(b) by 587 days.

(21) Appl. No.: 11/464,026

(22) Filed: Aug. 11, 2006

(65) Prior Publication Data

US 2008/0036238 A1 Feb. 14, 2008

(51) Int. Cl.
*B60J 5/04* (2006.01)
(52) U.S. Cl. .................................. 296/146.1
(58) Field of Classification Search .............. 296/146.1, 296/147, 146.9
See application file for complete search history.

(56) References Cited

U.S. PATENT DOCUMENTS

| | | | |
|---|---|---|---|
| 709,894 A | 9/1902 | Farrell |
| 1,118,721 A | 11/1914 | Wiss |
| 1,133,335 A | 3/1915 | Summers |
| 1,170,129 A | 2/1916 | Weaver |
| 1,181,331 A | 5/1916 | Metzger |
| 1,620,494 A | 3/1927 | Schnabel |
| 1,749,473 A | 3/1930 | Des Islets |
| 1,873,131 A | 8/1932 | Josephson |
| 1,874,364 A | 8/1932 | Sartain |
| 1,890,257 A | 12/1932 | Hafner et al. |
| 1,907,217 A | 5/1933 | Rott |
| 1,980,089 A | 11/1934 | Rice, Jr. |
| 2,125,205 A | 7/1938 | Snowden |
| 2,313,120 A | 3/1943 | Bonsall |
| 2,321,539 A | 6/1943 | Zeidler |
| 2,464,923 A | 3/1949 | Davis |
| 2,484,572 A | 10/1949 | Jude |
| 2,507,497 A | 5/1950 | Bowers |
| 2,550,935 A | 5/1951 | Pike |
| 2,569,763 A | 10/1951 | Hofferberth |
| 2,599,747 A | 6/1952 | Craigon |
| 2,613,844 A | 10/1952 | Mounce |
| 2,617,270 A | 11/1952 | Ruth |
| 2,620,226 A | 12/1952 | Jones |
| 2,627,092 A | 2/1953 | Grossman |
| 2,633,714 A | 4/1953 | Wehby |
| 2,635,559 A | 4/1953 | Nystrom et al. |
| 2,646,949 A | 7/1953 | Saulnier |
| 2,659,939 A | 11/1953 | Greig |
| 2,677,244 A | 5/1954 | Wehby |

(Continued)

OTHER PUBLICATIONS

Drake Truck Bodies—Refrigerated Trailers: http://www.draketruck.com/prod05-t.htm (Admitted Prior Art), May 17, 2005.

(Continued)

*Primary Examiner*—H Gutman
(74) *Attorney, Agent, or Firm*—Jacox, Meckstroth & Jenkins

(57) ABSTRACT

An inner or secondary door and temperature control system for use on a vehicle or trailer having a storage compartment and a first or primary door associated with a first entry or entryway into the storage compartment. The secondary door provides a moveable barrier or door that is situated in operative relationship to the first entry or entryway associated with the first door in order to prevent thermal loss from the storage compartment area during deliveries or at times when the first door is open.

41 Claims, 12 Drawing Sheets

U.S. PATENT DOCUMENTS

| | | | |
|---|---|---|---|
| 2,704,866 A | 3/1955 | Grossman | |
| 2,783,718 A | 3/1957 | Cheshire | |
| 2,788,750 A | 4/1957 | Priest | |
| 2,878,532 A | 3/1959 | Clark | |
| 2,996,844 A | 8/1961 | Paulson | |
| 3,057,284 A | 10/1962 | Learmont | |
| 3,100,458 A | 8/1963 | Baker et al. | |
| 3,425,162 A | 2/1969 | Halpern | |
| 3,561,226 A | 2/1971 | Rubin | |
| 3,800,488 A | 4/1974 | Swanson | |
| 3,864,936 A | 2/1975 | Frank et al. | |
| 3,946,524 A | 3/1976 | Budich | |
| 4,159,141 A | 6/1979 | Dirck | |
| 4,206,616 A | 6/1980 | Frank et al. | |
| 4,218,104 A | 8/1980 | Anderson et al. | |
| 4,299,429 A | 11/1981 | Franklin, Jr. | |
| 4,335,547 A | 6/1982 | Maxwell | |
| 4,381,629 A | 5/1983 | Ahn | |
| 4,470,228 A | 9/1984 | Dirck | |
| 4,498,306 A | 2/1985 | Tyree, Jr. | |
| 4,502,293 A | 3/1985 | Franklin, Jr. | |
| 4,505,126 A * | 3/1985 | Jones et al. | 62/239 |
| 4,516,482 A | 5/1985 | Smith | |
| 4,593,536 A | 6/1986 | Fink et al. | |
| 4,679,366 A | 7/1987 | Hitchins | |
| 4,704,876 A | 11/1987 | Hill | |
| 4,712,195 A | 12/1987 | Finger | |
| 4,761,969 A | 8/1988 | Moe | |
| 4,782,630 A | 11/1988 | Kleyn | |
| 4,787,184 A | 11/1988 | Boidron | |
| 4,833,829 A | 5/1989 | Wilson | |
| 4,891,954 A | 1/1990 | Thomsen | |
| 4,919,477 A | 4/1990 | Bingham et al. | |
| 4,950,869 A | 8/1990 | Mueller | |
| 4,951,479 A | 8/1990 | Araquistain et al. | |
| 5,010,943 A | 4/1991 | Boyer | |
| 5,029,450 A | 7/1991 | Takano et al. | |
| 5,054,295 A | 10/1991 | Goulooze | |
| 5,074,126 A | 12/1991 | Mahieu | |
| 5,129,235 A | 7/1992 | Renken et al. | |
| 5,152,155 A | 10/1992 | Shea et al. | |
| 5,161,848 A | 11/1992 | Lutton | |
| 5,168,717 A | 12/1992 | Mowatt-Larssen | |
| 5,224,297 A | 7/1993 | Watkins | |
| 5,323,622 A | 6/1994 | Weiner et al. | |
| 5,345,722 A | 9/1994 | McKann | |
| 5,379,518 A | 1/1995 | Hopper | |
| 5,415,009 A | 5/1995 | Weiner et al. | |
| 5,423,193 A | 6/1995 | Claterbos et al. | |
| 5,460,013 A | 10/1995 | Thomsen | |
| 5,660,057 A | 8/1997 | Tyree, Jr. | |
| 5,692,349 A | 12/1997 | Guillemet | |
| 5,704,676 A * | 1/1998 | Hill | 296/24.35 |
| 5,765,485 A | 6/1998 | Thoman et al. | |
| 5,855,174 A | 1/1999 | Thoman et al. | |
| 5,865,498 A | 2/1999 | Grogan | |
| 5,890,435 A | 4/1999 | Thoman et al. | |
| 5,901,511 A | 5/1999 | Yoshida | |
| 5,929,580 A * | 7/1999 | Mullet et al. | 318/466 |
| 5,979,173 A | 11/1999 | Tyree | |
| 6,000,342 A | 12/1999 | Thoman et al. | |
| 6,014,866 A | 1/2000 | Durham | |
| 6,131,340 A | 10/2000 | Clark et al. | |
| 6,196,295 B1 | 3/2001 | Durham | |
| 6,225,904 B1 * | 5/2001 | Jaffe et al. | 340/545.6 |
| 6,293,121 B1 | 9/2001 | Labrador | |
| 6,330,763 B1 | 12/2001 | Kern et al. | |
| 6,360,487 B1 * | 3/2002 | Kern et al. | 49/231 |
| 6,378,319 B1 | 4/2002 | Mani | |
| 6,386,560 B2 | 5/2002 | Calender | |
| 6,405,644 B1 | 6/2002 | Windecker | |
| 6,431,628 B1 | 8/2002 | Bell, Jr. | |
| 6,442,957 B1 | 9/2002 | Voogt et al. | |
| 6,446,452 B2 | 9/2002 | Durham | |
| 6,655,766 B2 | 12/2003 | Hodges | |
| 7,490,654 B2 * | 2/2009 | Gomaa et al. | 160/116 |

OTHER PUBLICATIONS

Econo Max Manufacturing, Inc.—Applications for strip curtain material: http://www.bmil.com/chase-economax/strip_curtains.htm (Admitted Prior Art), May 17, 2005.

Kidron, "News You Can Use From Kidron, vol. 3, Issue 1," Jan. 2005. Copyright 2005, Kidron, 13442 Emerson Road, Kidron, Ohio 44636. (Admitted Prior Art).

* cited by examiner

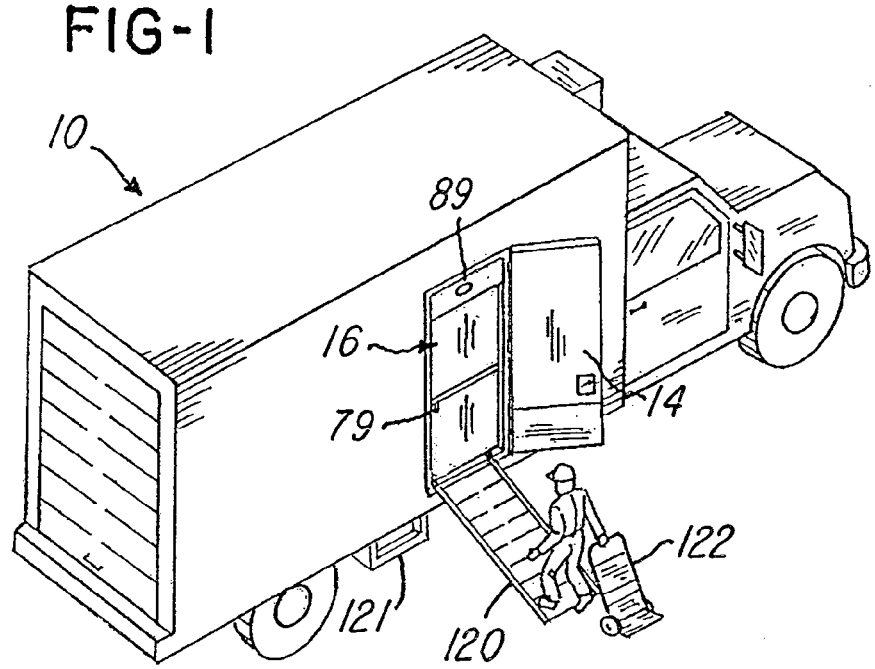
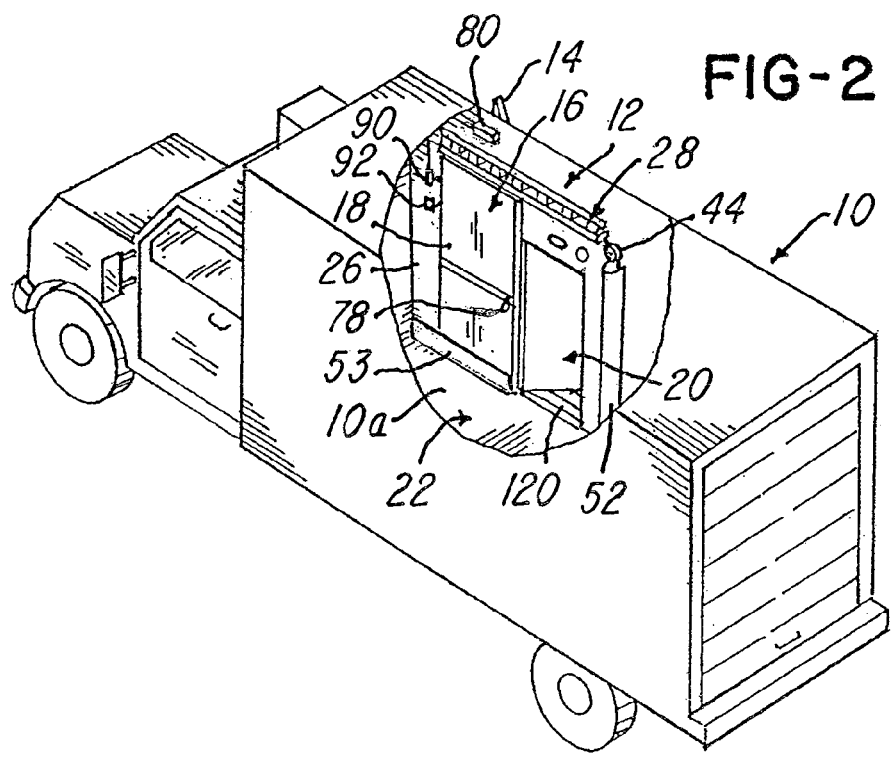

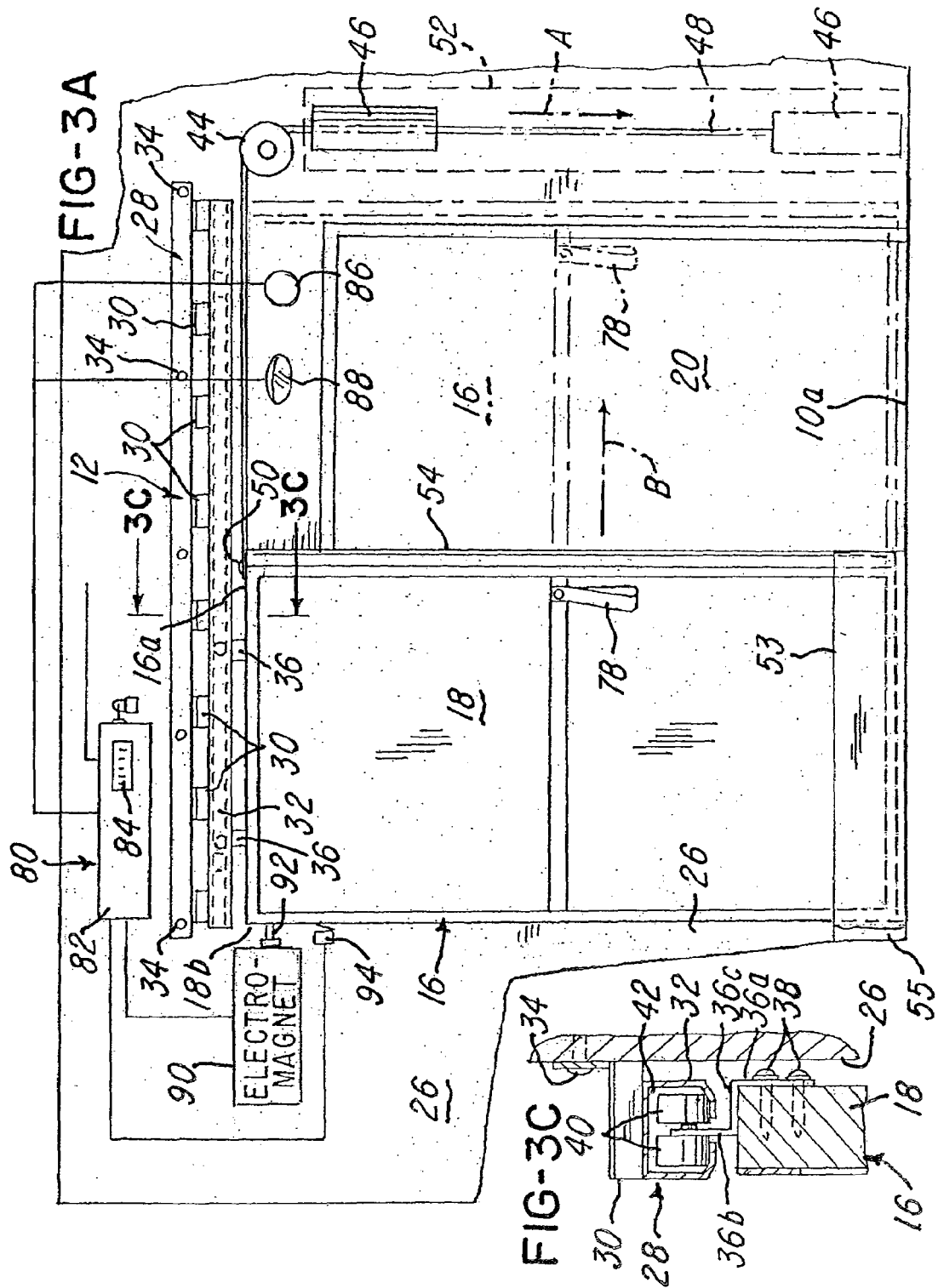

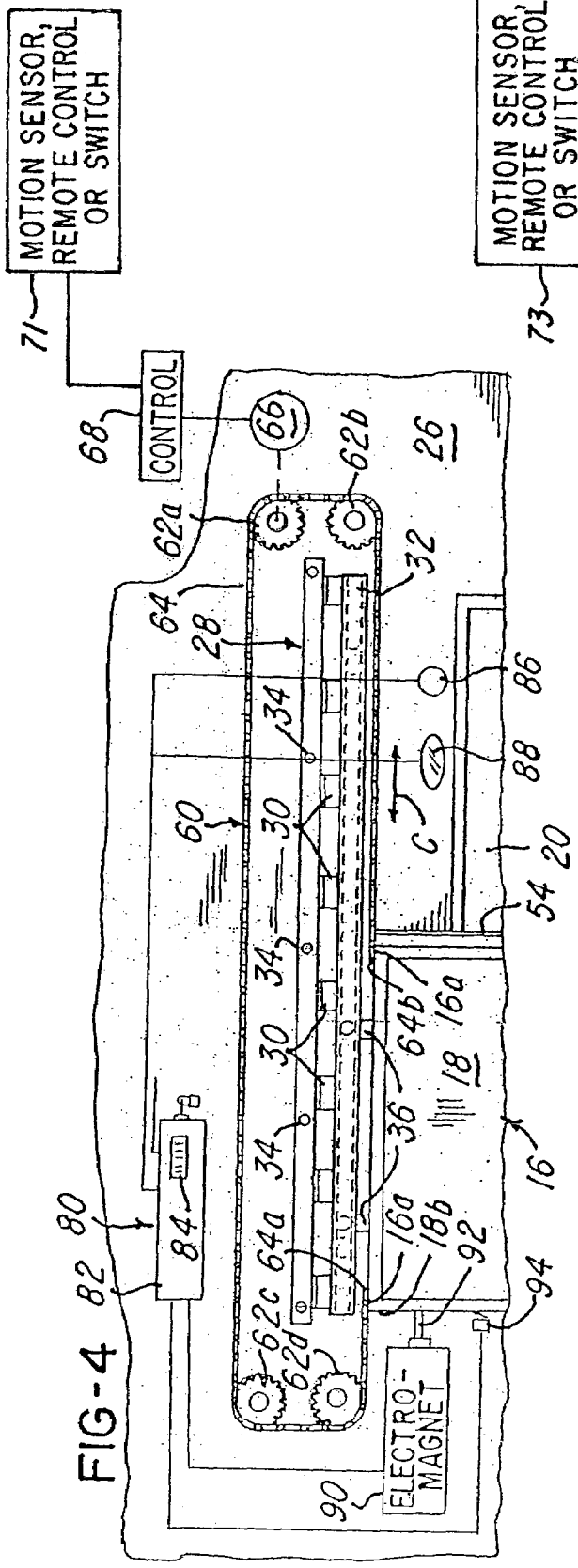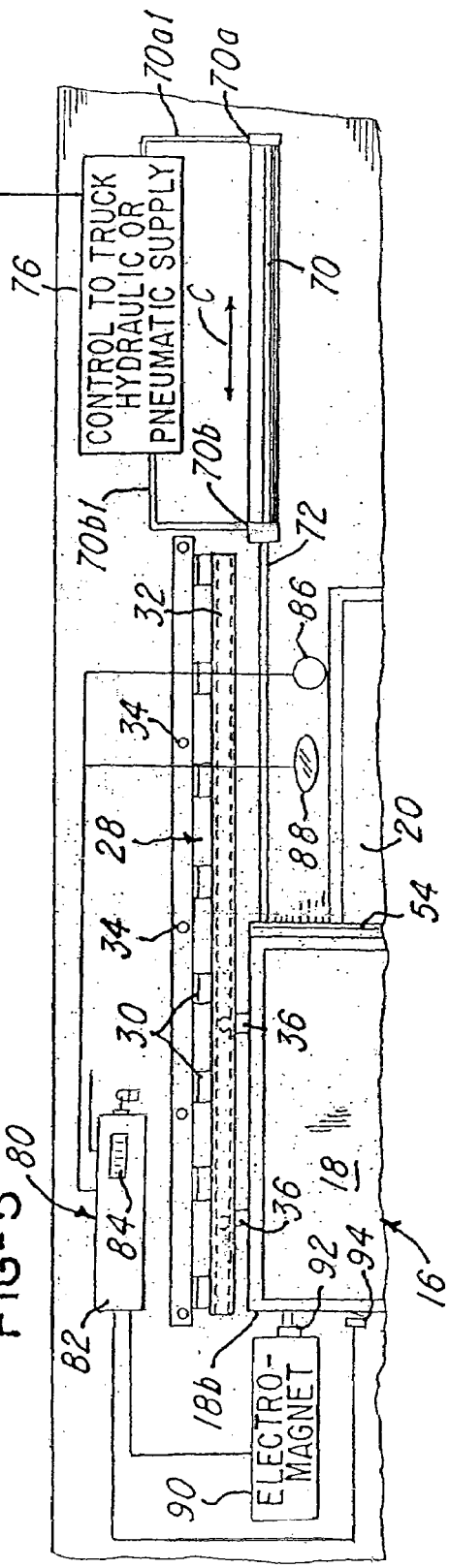
FIG-4
FIG-5

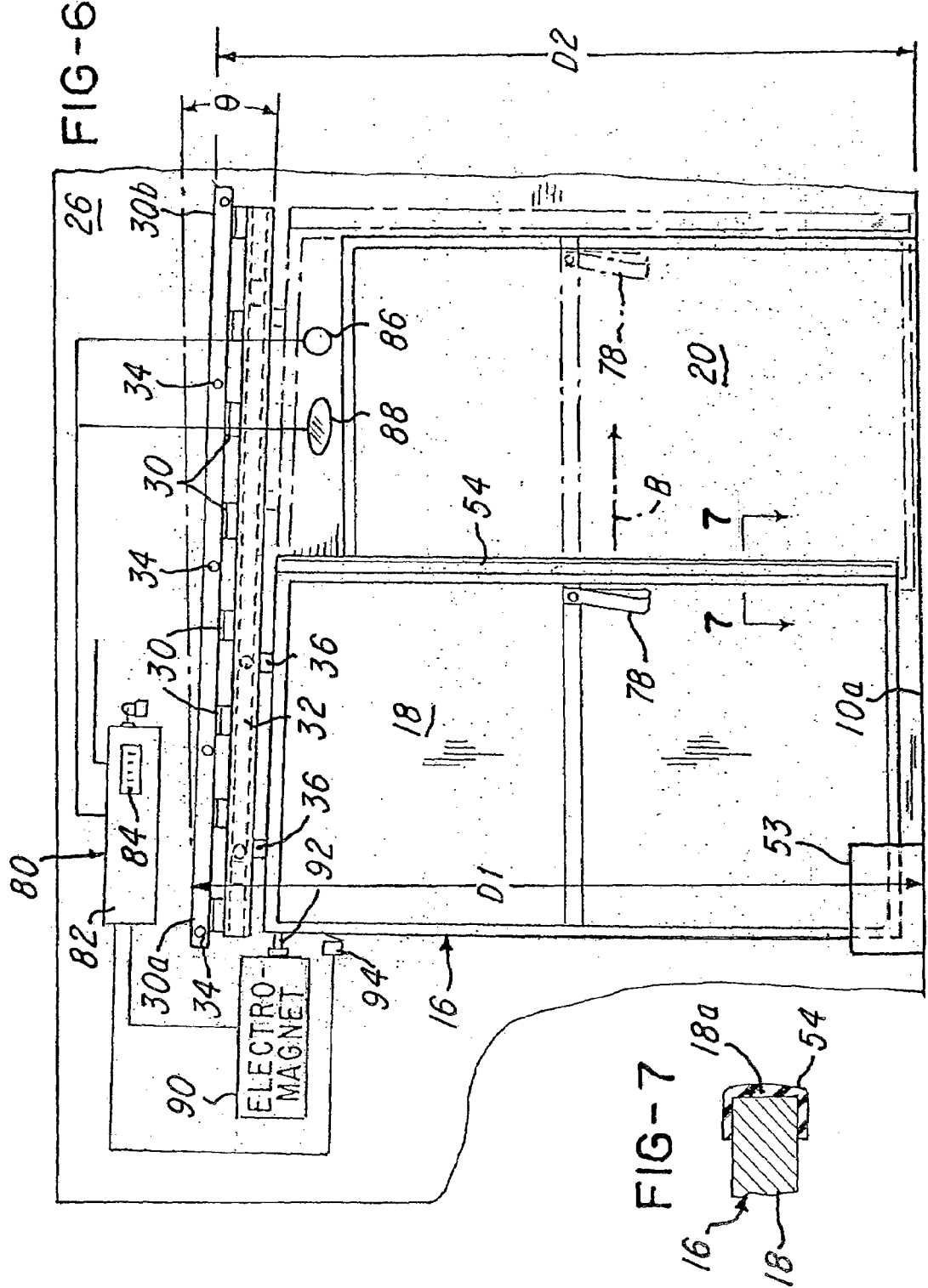

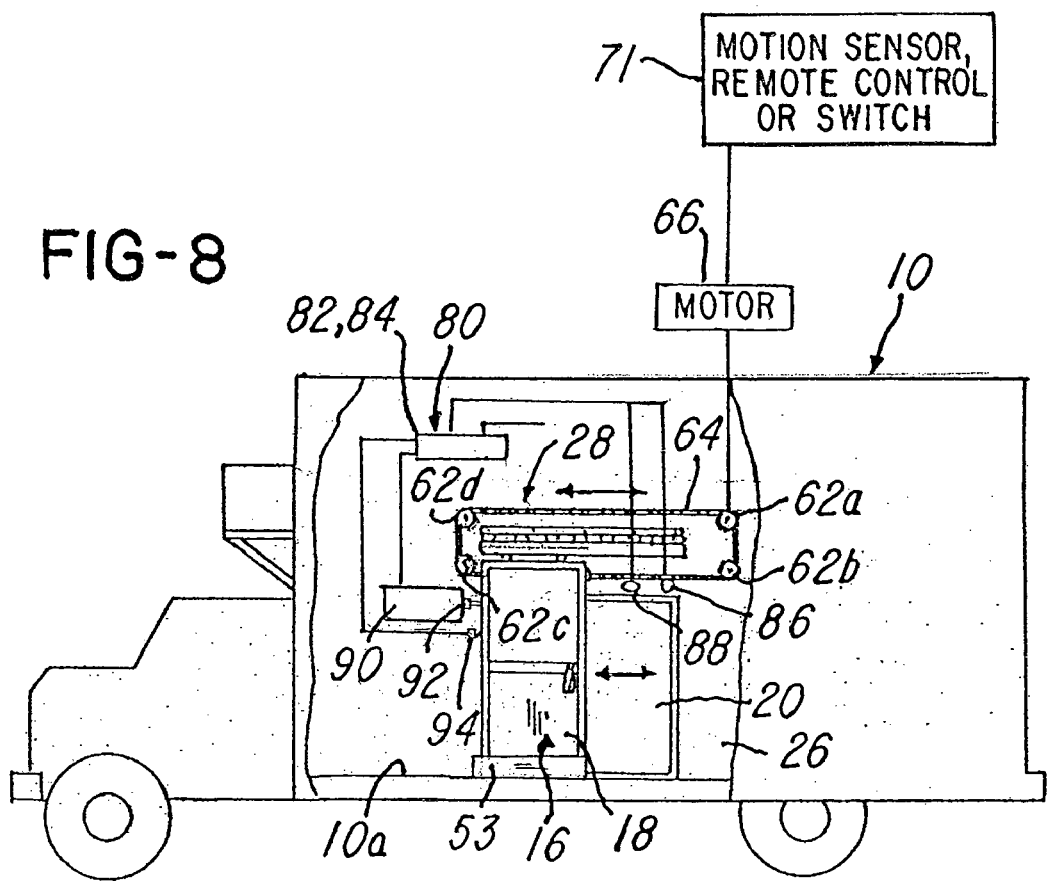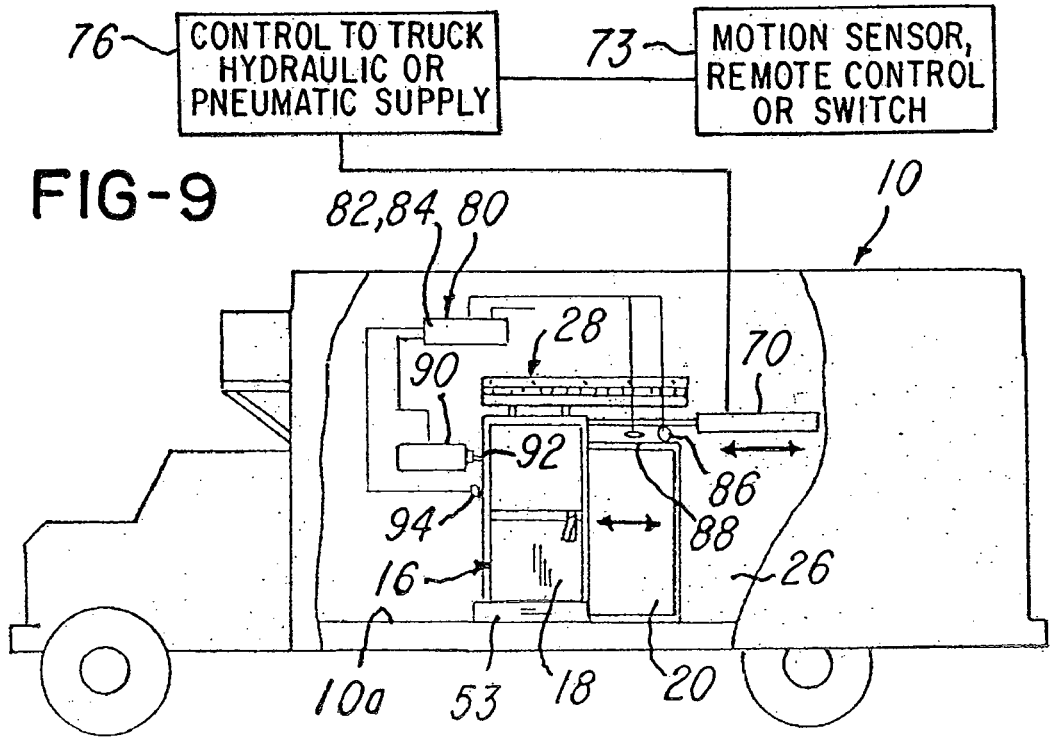

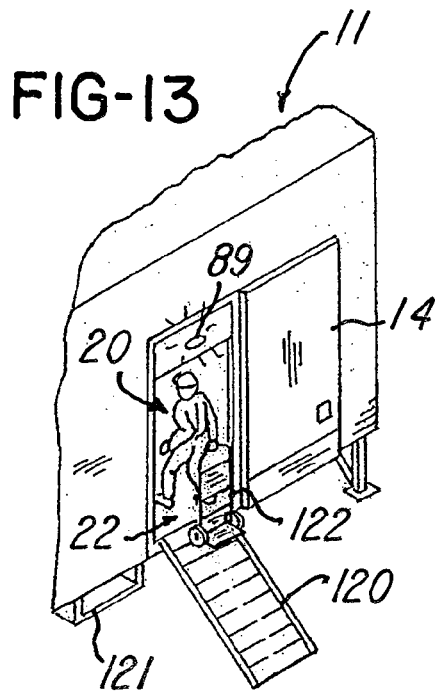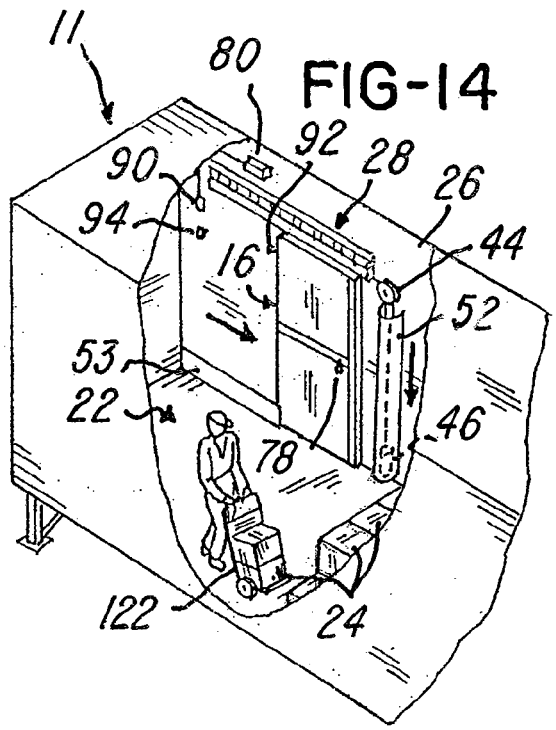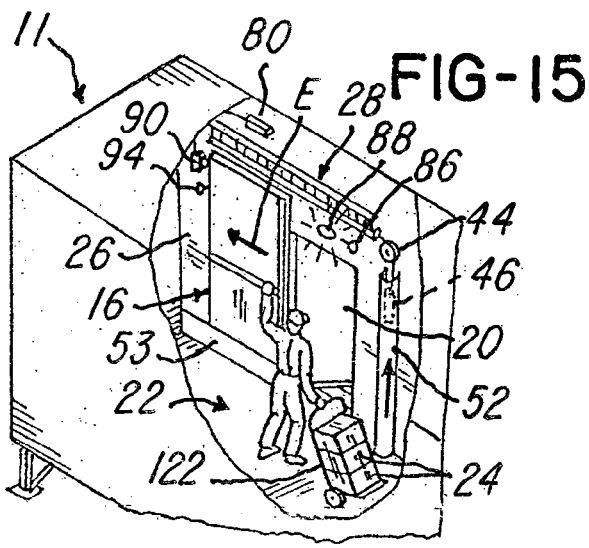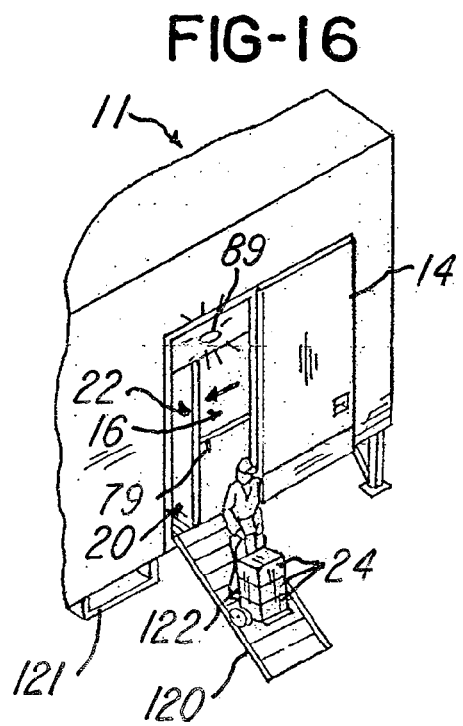

SECONDARY DOOR AND TEMPERATURE CONTROL SYSTEM AND METHOD

BACKGROUND OF THE INVENTION

1. Field of the Invention

This invention relates to an inner sliding or secondary door and temperature control system and method and more particularly, to a secondary door used to facilitate reducing thermal loss and maintaining a temperature in a storage area of a vehicle or trailer within a predetermined or desired temperature range.

2. Description of the Prior Art

During delivery of products, such as frozen food or chilled beverages, delivery drivers are currently required to repeatedly open and close a door on the vehicle or trailer that leads to, for example, a compartment on the vehicle or trailer. With some vehicles, the door is a pivoting or swinging side door on a side of the vehicle. Sometimes a switch shuts down the refrigeration unit, commonly referred to as a "reefer" unit, while the door is open. This is to prevent the refrigeration unit from condensing and being overcome by condensation resulting from the outside warm air which enters the storage compartment when the door is open. When the outside warm air reaches the refrigeration unit, while the unit is running, the warm air will eventually cause the refrigeration unit to "ice up" or "freeze up" and thereby prevent it from blowing cold air and cooling the storage compartment.

In instances where a door switch is used to control the reefer unit, the freezing up phenomenon can be reduced or avoided. However, such systems typically require that the driver open and shut the swinging door on the side of the vehicle each time the driver enters or leaves the storage area of the vehicle. Depending on the size and quantity of product to be delivered, this can result in the opening and closing of the swinging door multiple times, such as 10 times or more, for each delivery.

Because of the nuisance to having to repeatedly open and close the swinging side door, some drivers will typically leave the swinging side door open during the entire delivery process, even if they are not authorized to or are prohibited from doing so. This action most easily is compared to leaving a refrigerator door open for a long period of time. In general, a substantial loss of some, most or all of the cold air from the storage compartment area will occur. The increase in temperature in the storage area has an adverse effect on the quality of the product or cargo stored in the storage compartment.

In vehicles or trailers that are not equipped with door switches, the reefer or refrigeration unit will continue to run regardless of whether the door is open or closed. During quick deliveries, or when the outside temperature is cold, the unit will typically not freeze up the storage compartment area, but the storage compartment area will lose all the cold air during delivery and the reefer unit will continue to run in an attempt to regain the desired or optimal temperature in the storage compartment area. When it is warm outside the storage compartment area, the reefer unit in many cases freezes up during delivery. Once this happens, the reefer unit must be manually defrosted, which can require ½ hour to 1 hour or more to manually defrost the reefer unit. During the entire time that the reefer unit is manually defrosting, there is no cooling of the storage compartment area, which means that the temperature inside the storage compartment area could reach levels that are critical in that they can cause food spoilage or damage to the goods being transported. This is especially a problem if the driver leaves the door open or circumvents its closing.

Even in cases where there is a shut-off switch, once the swinging side door is shut again, the reefer unit will have to run much harder and continuously to achieve the desired temperature in the storage compartment area.

There is, therefore a need to provide a simplified system and method for reducing or eliminating one or more of the problems with the prior art.

SUMMARY OF THE INVENTION

It is therefore an object of the invention to provide at least one secondary door that is situated on the inside of the storage compartment area or built into a wall of the storage compartment area that will reduce the risk of loss of temperature inside the storage compartment area.

Another object of the invention is to provide a system and method that facilitates maintaining a temperature in the storage compartment area within a predetermined temperature range.

Still another object of the invention is to prevent any adverse effects on the quality of the product being transported by the delivery vehicle or trailer.

Yet another object of the invention is to provide a secondary door having one or more panels that can slide in operative relationship with an entryway associated with a primary door, such as the swinging doors.

Still another object is to provide at least one secondary door or panel that can slide or move generally parallel to a wall or to an imaginary plane in which an entryway to the storage compartment lies in order to minimize the amount of space used by the secondary door when it is moved between an open position and a closed position.

In one aspect, one embodiment relates to a secondary delivery door system for mounting on a vehicle having a storage compartment and a first door associated with a first entry into the storage compartment, the secondary delivery door comprising: a body member, and at least one fastener for moveably attaching the body member to the vehicle in operative relationship with the first door so that when the first door is opened, the body member at least partially closes the first entry, thereby maintaining a temperature in the storage compartment within a predetermined temperature range, the at least one fastener permitting the body member to be moved from a first position to an open position during which the storage compartment may be accessed by a user.

In another aspect, another embodiment relates to a method for maintaining a desired temperature in a storage compartment of a vehicle, the vehicle comprising a first door associated with an entryway of the storage compartment, the method comprising the steps of: providing a moveable barrier having a first end moveably mounted to the vehicle, the barrier controlling heat exchange through the entryway between the storage compartment and an outside area while the first door is in an open position, and enabling the first end of the moveable barrier to be moved from a closed position during which the moveable barrier closes the entryway and the open position during which a user may pass through the entryway.

In still another aspect, another embodiment relates to a method for controlling a temperature in a storage compartment of a delivery vehicle having a primary access door mounted to a first wall of the vehicle to provide access to the storage compartment and a secondary access door mounted to the vehicle in opposed relationship to the primary access door, the method comprising the steps of: retaining the secondary access door in an open position for a first predetermined time, and generating an alarm indicating movement of the secondary access door away from the open position after a second predetermined time.

Other objects and advantages of the invention will be apparent from the following description, the accompanying drawings and the appended claims.

BRIEF DESCRIPTION OF THE ACCOMPANYING DRAWINGS

FIG. 1 shows a vehicle with a primary door in an open position revealing an entryway and a secondary door in a closed position;

FIG. 2 is a fragmentary view of the vehicle shown in FIG. 1 showing various details of a storage compartment area in the vehicle;

FIG. 3A is a fragmentary enlarged view of a support system and secondary door and temperature control system in accordance with one embodiment of the invention;

FIG. 3C is fragmentary sectional view taken along the line 3C-3C in FIG. 3A;

FIG. 4 is a fragmentary view illustrating another embodiment utilizing a motor;

FIG. 5 is a fragmentary view of still another embodiment showing the system used with a cylinder;

FIG. 6 is a fragmentary view illustrating a support situated in a predetermined angle Θ so that the door may be urged by gravity to a closed position;

FIG. 7 is a fragmentary sectional view taken along the lines 7-7 in FIG. 6;

FIG. 8 is fragmentary view showing various details of the system shown in FIG. 4 situated in a vehicle or trailer;

FIG. 9 is fragmentary view similar to FIG. 8 showing the system of FIG. 5 situated in a vehicle or trailer;

FIG. 13 is a fragmentary view of the trailer shown in FIG. 11 showing both the primary and secondary doors in the open position, thereby enabling a delivery driver to enter a storage compartment area in the vehicle;

FIG. 14 is a view illustrating the secondary door moving to the closed position;

FIG. 15 is a view illustrating the delivery driver manually opening the secondary door while in the storage compartment area;

FIG. 16 is a view illustrating the secondary door automatically closing after the deliver driver exits the storage compartment area;

DETAILED DESCRIPTION OF THE PREFERRED EMBODIMENTS

Figure 3B:
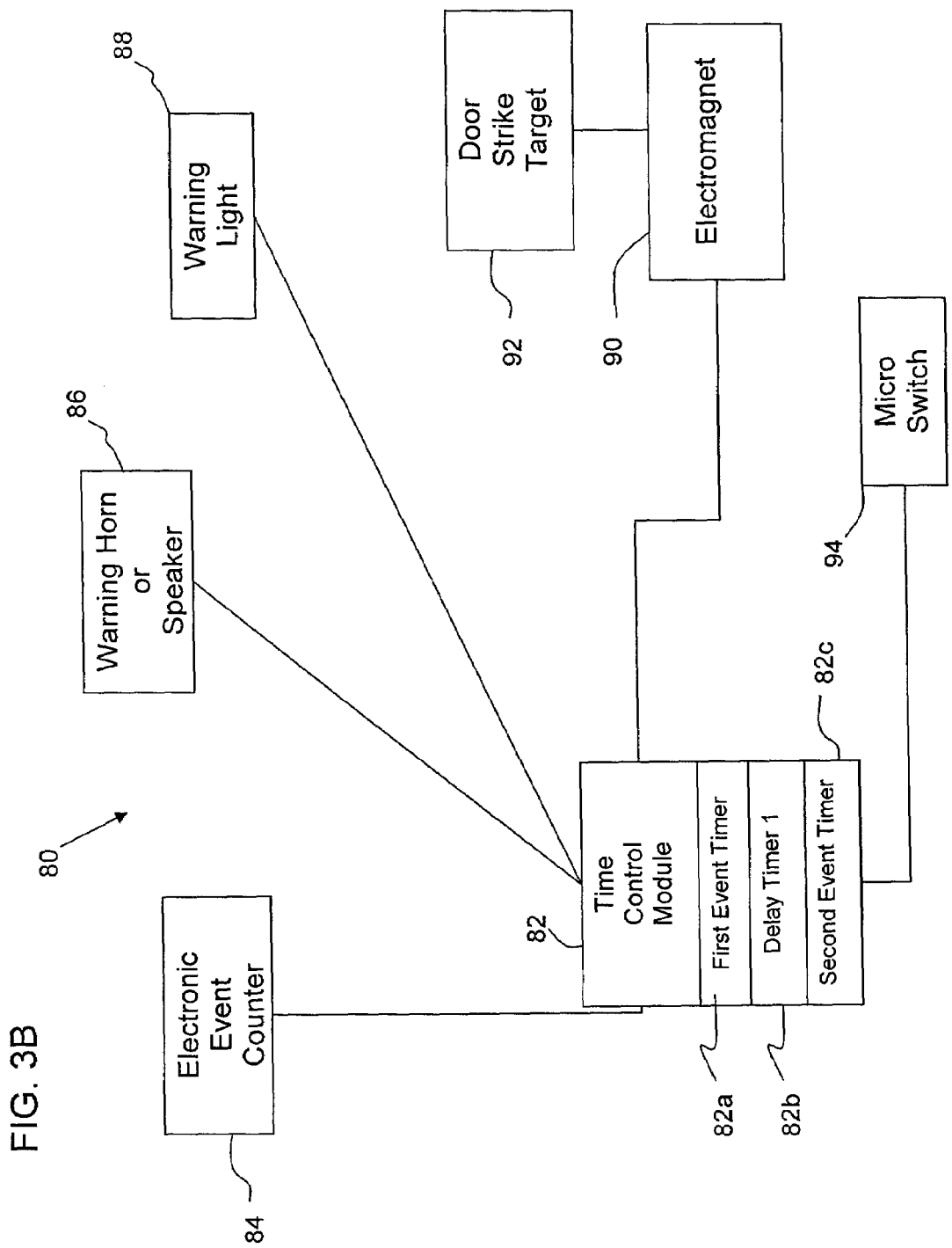
FIG. 3B is schematic view of a control or monitoring system in accordance with one embodiment of the invention.

Referring now to FIGS. 1 and 2, a delivery vehicle 10 is shown having a secondary delivery door and temperature control system 12. In the illustration being described, the secondary delivery door and temperature control system 12 is intended for use primarily with refrigerated trailers 11 (FIGS. 10-18), the delivery vehicle 10 (FIGS. 1-2), such as delivery trucks having refrigerated compartments, or refrigerated areas wherein it is desired to maintain a predetermined temperature within a predetermined temperature range. For ease of description, most of the references herein are to a vehicle 10, but it should be understood that the features of the invention are equally applicable to, for example, the trailer 11. Temperature control is particularly desired when transporting frozen or chilled items, such as food and beverages.

As illustrated in FIGS. 1 and 2, the delivery vehicle 10 comprises a first or primary door 14, at least one moveable barrier, and a second or secondary door 16, as shown. Notice that the first or primary door 14 pivots from a closed position (not shown) to an open position, as illustrated in FIGS. 1 and 10-12. In this example, the door 14 is accessible from outside the vehicle 10. Notice also that the primary door 14 is conventionally hingeably mounted to or in association with a wall 26 of the vehicle 10 using a plurality of hinges (not shown) to permit swinging or pivoting movement. The first door 14 is associated with a first entryway or entry 20 into a storage compartment or area 22 (FIG. 2) in the vehicle 10 where product, cargo or items to be stored or transported, such as the items 24 illustrated in FIG. 15, are situated.

The secondary door 16 comprises at least one panel or body member 18 (FIG. 3A). As best illustrated in FIGS. 3A and 4-6, the system 12 comprises a mount or at least one fastener or mount 28 for movably or slidably attaching the secondary door 16 to the wall 26 of the vehicle 10. The at least one fastener or mount 28 comprises an elongated rail or support 30 (FIG. 3C) having a channel or track 32 secured thereto or integral therewith. As illustrated in FIG. 3C, the support 30 is secured to the wall 26 using conventional fasteners, such as screws 34.

A plurality of brackets 36 are secured at spaced intervals to the panel 18 by conventional means, such as the screws 38. The brackets 36 each comprise a first leg 36a secured to the panel 19 by screws 38, a second leg 36b and a joining leg 36c for joining the first and second legs. The second leg 36b rotatably supports at least one or a plurality of wheels or rollers 40 that are received in the area 42 defined by the track 32 as illustrated in FIG. 3C.

Figure 10:
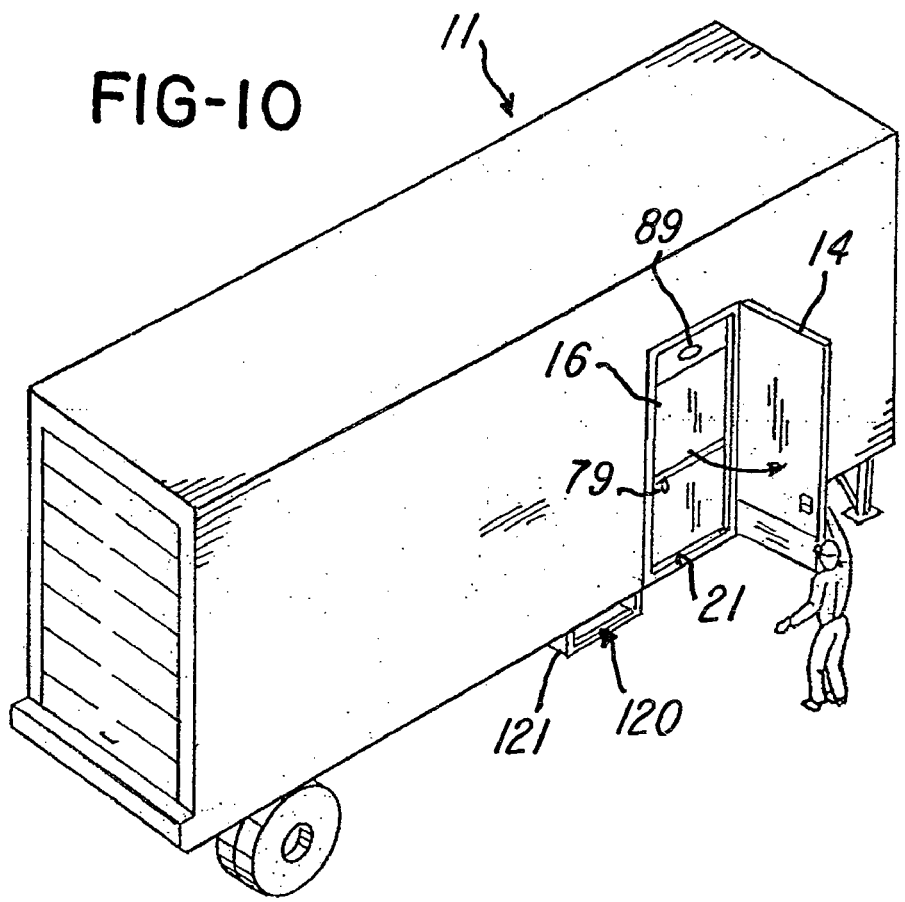
FIG. 10 is a view showing an embodiment utilized on a trailer and also showing a first or primary door being moved from a closed position to an open position.
Figure 11:
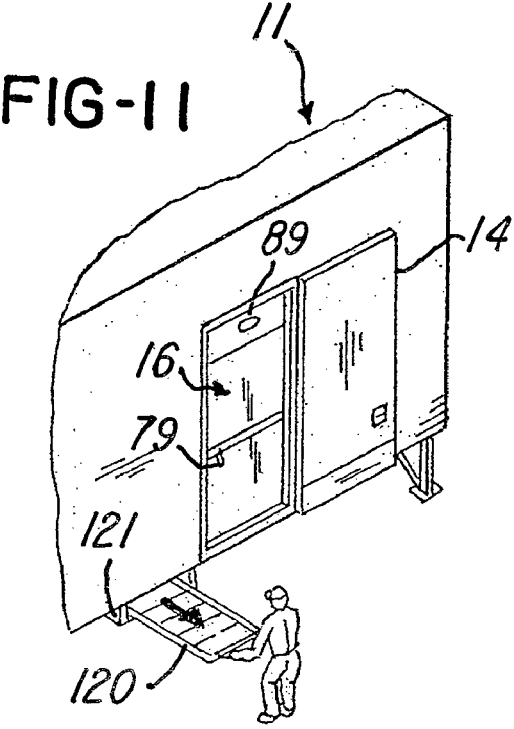
FIG. 11 is a fragmentary view of the trailer shown in FIG. 10 showing the first or primary door in a fully opened position, thereby revealing the secondary door in a closed position.
Figure 12:
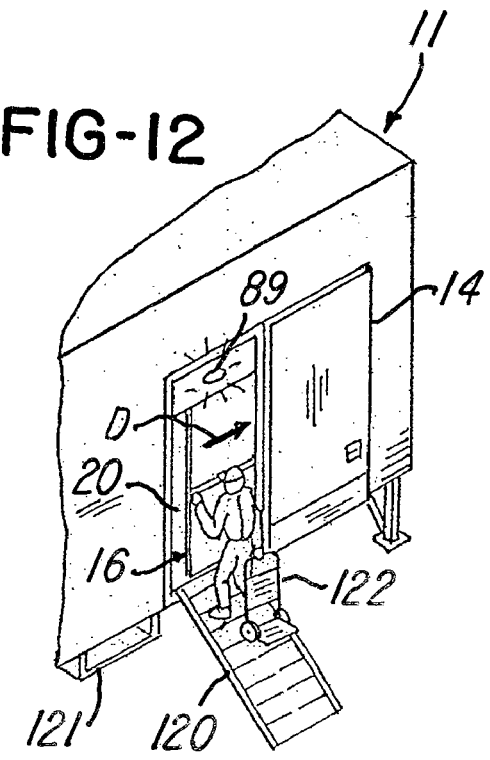
FIG. 12 is view illustrating the second door being moved from a closed position to an open position.

As with the first door 14, the second door 16 is mounted to the wall 26 such that it is slidably and moveably attached to the wall 26 so that the door 16 and the associated panel 18 may be moved from a closed position, illustrated in FIGS. 1 and 10, to an open position, illustrated in FIGS. 3A, 6 and 12, for example. Notice in FIGS. 10-12 that when the first door 14 is moved to the open position, illustrated in FIGS. 10-12, the second door 16 may at least partially or fully close the first entryway or entry 20 as shown. This facilitates and enables the temperature in the storage compartment 22 to be maintained within the predetermined range, which will vary depending on what items are being delivered. For example, frozen pizza may be kept at 5° to 20° Fahrenheit, whereas ice cream would be kept at −10° to −20° Fahrenheit.

The at least one fastener or mount 28 is secured to the wall 26 which in the embodiment being described is the same wall 26 to which the first door 14 is hingeably fastened. Notice that the door 16 is generally parallel to wall 26 or an imaginary plane in which the entryway 20 lies. The at least one fastener or mount 28 enables the system 12 to be retrofitted onto an existing vehicle 10 or trailer 11 or installed as original equipment at the time of manufacture. The system 12 may be provided in a kit (not shown) if desired. Notice also that when the second door 16 is in the closed position, illustrated in phantom in FIG. 3A, the second door 16 at least partially or fully blocks the first entryway 20 as shown. This in turn prevents, among other things, warm air from entering storage area 22 and/or conditioned air from escaping the storage area 22.

Advantageously, the second door 16 facilitates maintaining the predetermined temperature in the storage area 22 within the predetermined temperature range mentioned earlier herein. Thus, when the first door 14 is in the open position, as illustrated in FIG. 11, the movable second door 16 will fully or partially close the entryway 20. During use, the operator may manually slide or move the second door 16, as illustrated in FIGS. 12 and 15, in the manner described in more detail later herein. In other embodiments, the door 16 may be driven by a driver, such as an electric motor (FIG. 4) or hydraulic or pneumatic cylinders (FIG. 5). This sliding design feature is advantageous because it enables the door 16 to consume a relatively small amount of the storage area 22 during use, which would not be the case with a swinging door. Although not shown, a plurality of doors 16 may be provided, such as doors 16 situated on either side of entryway 20, double sliding doors, stacked doors or the like.

The system 12 also comprises means or apparatus to retain or bias the second door 16 in the closed position illustrated in FIGS. 1 and 11. In one embodiment, the system 12 may comprise a pulley 44 (FIG. 3A) that cooperates with a counterweight 46 that is attached to a rope 48. The rope 48 is in turn fastened to a top edge 16a of the second door 16 by conventional means, such as a screw 50. The counterweight 46 is urged by gravity in the direction of arrow A and cooperates with the pulley 44 to pull the second door 16 in the direction of arrow B, thereby urging or biasing the second door 16 toward the closed position, illustrated in FIGS. 1 and 11, for example.

When the second door 16 is in the closed position, the weight 46 has dropped downward to the position shown in phantom in FIG. 3A. An optional cover, labeled 52 (shown in phantom in FIG. 3A for ease of illustration), may be provided to facilitate preventing undesired movement of the counterweight 46 and to house the rope 48 on the pulley 44 as shown. Notice also that a kick plate 33 may be mounted by conventional means to a floor 10a of vehicle 10. The kick plate 33 cooperates with wall 26 to define a channel 35 in which a bottom of the second door 16 may slide.

It should be understood that the door 16 may be provided without the aforementioned counterweight 46 assist in which case the door 16 may be "hung" level to the floor 10a. In another embodiment, other means, apparatus or method may be provided for urging or biasing the door 16 toward the closed position. One such approach is illustrated in FIG. 6, wherein the support 30 is situated at a predetermined angle Θ such that the door 16 is urged by gravity to the closed position as shown. In this regard, notice in FIG. 6, that the support 30 is mounted to wall 26 such that a first end 30a is situated a predetermined distance D1 above a floor 10a of vehicle 10. A second end 30b is also situated a predetermined distance D2 above the floor 10a of vehicle 10. The predetermined distance D1 is greater than D2 so that the track 32 becomes situated at the predetermined angle Θ as shown. This feature reduces or eliminates the need for the counterweight 46 referred to in FIG. 3A and facilitates biasing the door 16 in the closed position.

Notice in FIGS. 3C and 7 that the second door 16 comprises the panel 18 that is made of, for example, wood, plastic, rubber, nylon, canvas, vinyl, metal or composite material. An edge 18a (FIG. 7) may comprise a generally U-shaped polymer or rubber sheath, guard or cover to provide a guard or protection to the edge 18a and also provide a cushion in the event that an interference, such as a package or person, is encountered when the second door 16 is moved to the closed position.

In the embodiment being illustrated in FIGS. 3A-3C, the mount or at least one fastener 28 may comprise a single track 32, but it should be appreciated that other approaches or means for movably or slidably attaching the second door 16 to the wall 26 may also be used. For example, a ball bearing track (not shown), a magnetized track, a cable pulley track, a chain sprocket track, wheels mounted on bottom of door or wheels on the top and the bottom of door or a plurality of tracks (not shown) may be used to movably mount the second door 16 to the wall 26.

Notice the relative relationship between the second door 16 and primary door 14 and entryway 20, namely, the support 30 is mounted above the entryway 20 and generally above the first primary door 14, as illustrated in FIGS. 3A, 4 and 5. This relationship enables the second door 16 to block and close the entryway 20 when the first primary door 14 is in the open position, such as illustrated in FIG. 13. Although not shown, a seal or weather strip may be provided on the door 16 or the wall 26 around the perimeter of entryway 20 to seal any gap between the door 16 and the wall 26.

The system 12 may comprise apparatus or means for automatically driving the second door 16 between the open and closed positions, and FIGS. 4, 5, 8 and 9 illustrate examples of this feature. For example, notice in FIGS. 4 and 8 that a drive train 60 may be provided. In the illustration being described, the drive train 60 comprises a plurality of sprockets 62a, 62b, 62c and 62d that support a drive chain 64 having one end 64a coupled to a top edge 16a of second door 16 and a second end 64b which is also coupled to the top edge 16a as shown. An electric motor 66, such as a ⅙ HP sealed 12 VDC electric motor, is coupled to sprocket 62a to rotatably drive the sprocket 62a in a clockwise or counterclockwise direction. The drive train 64 in turn drives the second door 16 in the direction of double arrow C to move or drive the second door 16 between the open and closed positions. In the illustration being described, the drive motor 66 may be coupled to a control 68 which may be in the form of a switch, remote control or other suitable means for enabling an operator to control the operation of the motor 66. Also, a motion sensor 71 (FIG. 4), remote control switch or other switch may be provided to generate a second signal which energizes the control 68. Such a sensor may be provided adjacent the door 16 on the wall 26 in the storage area 22, for example.

FIGS. 5 and 9 illustrate still another embodiment wherein a cylinder or actuator 70 is provided to drive the door 16. The actuator comprises an armature 72 having an end 72a coupled to the edge 18a (FIG. 7) of panel 18 as shown. In the illustration being described, the actuator 70 may be a pneumatic or hydraulic cylinder having orifices 70a and 70b that may be coupled to a pneumatic or hydraulic control 76 as shown.

Alternatively, the orifices 70a and 70b may be coupled via the conduits 70a1 and 70b1 to a hydraulic or pneumatic system (not shown) of the vehicle 10, which may provide a supply of hydraulic fluid or air for controlling the actuator or solenoid 70. A separate hydraulic or pneumatic control (not shown) would be used to control the hydraulic or pneumatic system.

As with the embodiment described earlier, note in the illustration being described that the drive motor 66 in FIG. 4 and the actuator 70 in FIG. 5 facilitate enabling the second door 16 comprising the panel 18 to be driven generally horizontally between the first or open position and the second or closed position.

The system 12 may also comprise a mechanical or electronic latch 90 with target 92 for retaining the second door 16 in the open position illustrated in FIG. A and may further comprise flexible straps or handles 78 (FIG. 3A) and 80 (FIG. 16) to facilitate the operator moving the second door 16 between the closed position and the open position, as illustrated in FIG. 12.

The system 12 further comprises a control and monitoring system and process 80 (FIGS. 3B, 20 and 21) for controlling and monitoring a use of the second door 16. The control or monitoring system 80 comprises a time control module 82 (FIGS. 3A and 3B) that is coupled to an electronic event counter 84, a warning alarm or horn 86 and a warning alarm or light 88. In the illustration being described, the time control module 82 energizes the warning light 88 to illuminate the entryway 20 when the second door 16 is closing and for a desired alarm period, such as 10 seconds. In the illustration being described, the warning light 88 is energized by time control module 82 to illuminate the entryway 20 whenever the second door 16 is moving from the open position to the closed position and for the alarm period of 10 seconds. The time control module 82 also energizes the warning alarm, horn or speaker 86 for the alarm period to provide an audible signal or warning to the operator when the door 16 is moving from the open position illustrated in FIG. 3A to the closed position illustrated in FIG. 14. The process of generating such alarm and alarm period is described later herein relative to FIG. 20.

The time control module 82 is also coupled to an electromagnet 90, which cooperates with a door strike or target 92 (FIGS. 3A and 3C) that is mounted on a second edge 18b of panel 18. As with the first edge 18a illustrated in FIG. 7, the second edge 18b may also comprise a protective guard or cover similar to the cover 54 illustrated in FIG. 7.

The system 80 further comprises a micro switch 94 that is coupled to the control module 82. The micro switch 94 is engaged by second edge 18b when the door 16 is opened and generates a signal in response thereto.

The operation of the control module 82 will now be described relative to FIGS. 10-19 and the schematic illustrated in FIGS. 20 and 21. During use, the operator opens the first door 14, as illustrated in FIGS. 10 and 11 and indicated at block 101 (FIG. 21). The operator may then use a conventional pull-out ramp 120 (FIGS. 11 and 12) stored in a storage cradle 121 underneath the vehicle, which in this example is a trailer 11, which is positioned at a threshold 21 (FIG. 10) of the entryway 20 as illustrated in FIG. 12. The operator may grasp the handle 79 (FIG. 11) and drive or move the second door 16 in the direction of arrow D in FIG. 12 to cause the second door 16 to be moved from the closed position to the open position (block 103 in FIG. 21), thereby providing access through the entryway 20 into the storage compartment 22. An optional light 89 (FIG. 12) may be coupled to the control module 82 or energized by a sensor, such as a motion sensor (not shown), and provided when the operator moves the second door 16. The optional light 89 operates and is energized automatically. This is particularly useful for the operator during deliveries in dark areas or at night.

For ease of illustration, the following description presumes the configuration is of the embodiment shown in FIG. 3A, but it should be understood that if the system 20 comprises the embodiments illustrated in FIG. 4 or 5, then the motion sensor 71, fixed switch or remote control switch referred to earlier may be provided for energizing either the motor 66 (FIG. 4) or the actuator 70 (FIG. 5) to drive the door 16 from the closed position to the open position.

Figure 20:
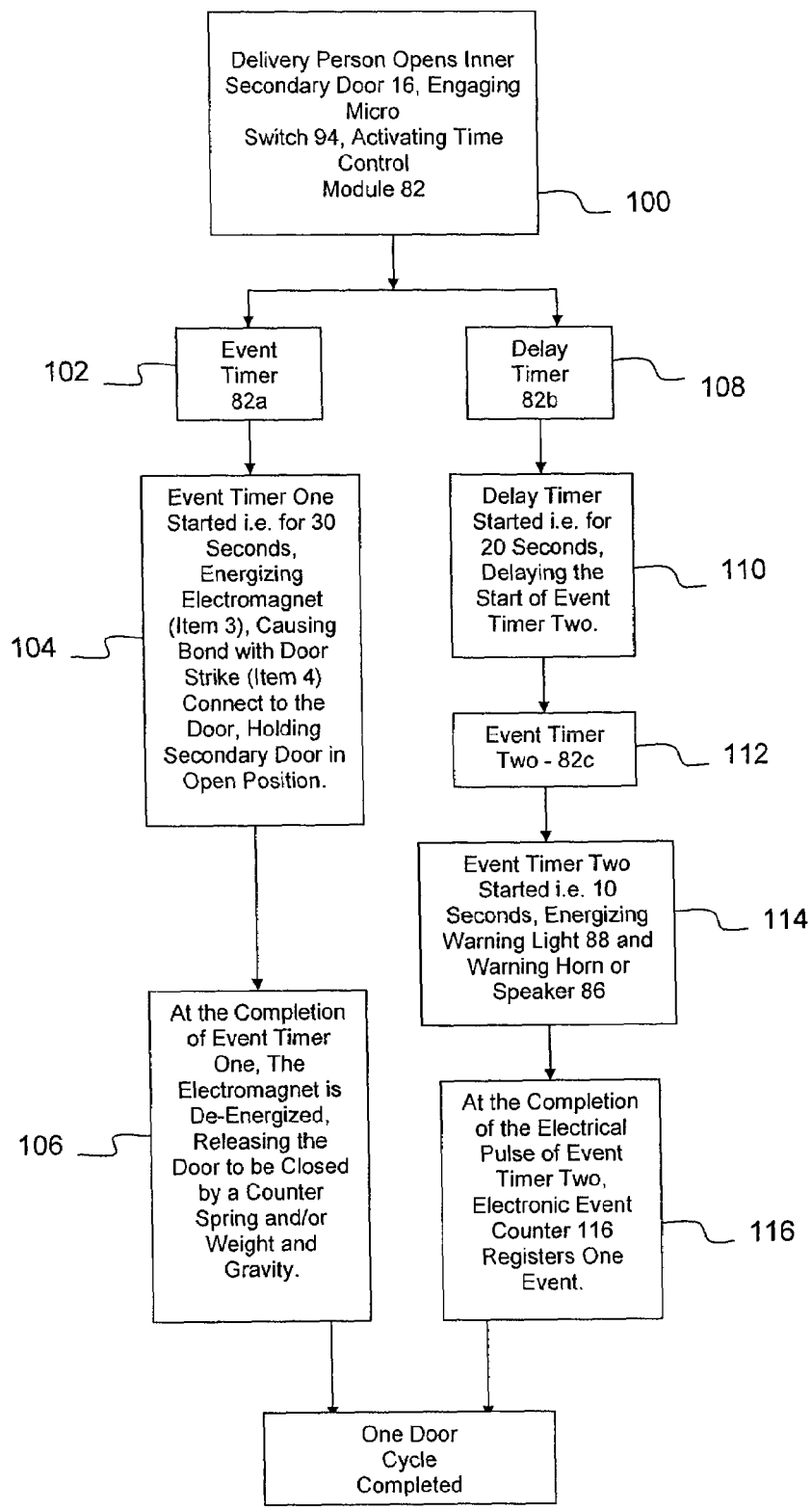
FIG. 20 is a schematic diagram of a door cycle in accordance with one embodiment of the invention.
Figure 21:
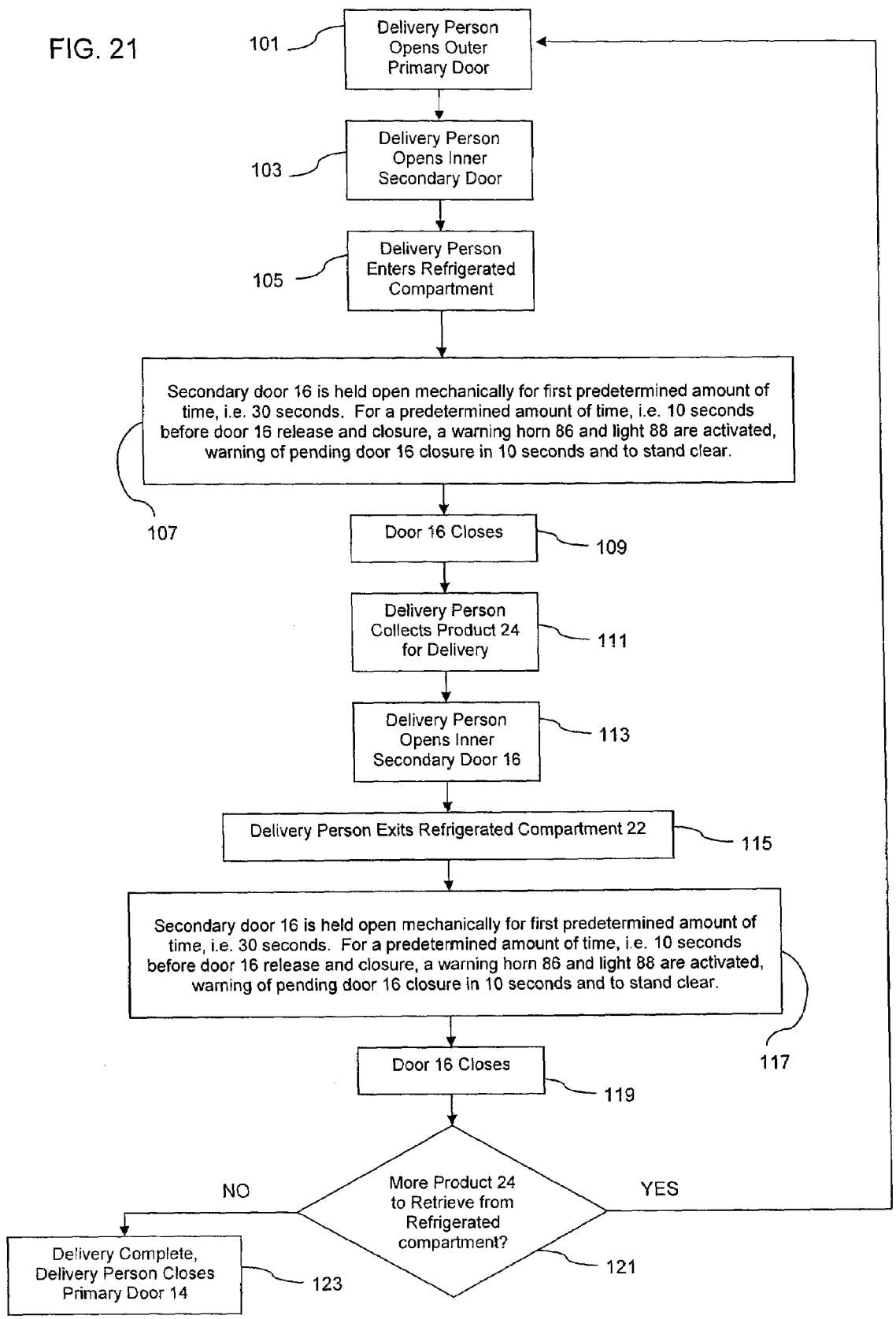
FIG. 21 is a schematic diagram of a process of using the primary and secondary doors in accordance with one embodiment of the invention.

Notice that when the second door 16 reaches the open position, illustrated in FIG. 3A, the edge 18b engages switch 94 which generates the aforementioned signal that is received by the time control module 82 (block 100 in FIG. 20). The time control module 82 comprises an event timer 82a (FIG. 3B) that is activated upon receipt of the signal from the micro switch 94 (block 102 in FIG. 20). The event timer 82a begins for a first predetermined period of time, such as 30 seconds in the illustration being described, and time control module 82 energizes electromagnet 90 to cooperate with door strike target 92 to retain the door 16 in the open position illustrated in FIG. 3A for the first predetermined period of time, as illustrated in block 104 in FIG. 20. The driver enters the storage area or compartment 22 (block 105 in FIG. 21).

At the expiration of the predetermined period of time, which as mentioned earlier is 30 seconds in the illustration being described, the time control module 82 ceases energizing the electromagnet 90 which causes the second door 16 to be released, as shown at block 107 in FIG. 21. In the illustration in FIG. 3A, for example, the second door 16 is urged by the counterweight 46 and gravity, from the open position to the closed position, shown in phantom in FIG. 3A. It should be understood that other latches, such as a mechanical latch with solenoid release, may also be used if desired.

Substantially simultaneously, when the micro switch 94 energizes the event timer 82a, the time control module 82 energizes a delay timer 82b (block 108 in FIG. 20) to begin for a second predetermined period of time, which in the illustration being described is less than the first predetermined period of time referred to earlier. For example, the second predetermined period of time may be less than 30 seconds or 20 seconds in the illustration being described.

At the expiration of the second predetermined period of time, the delay timer 82b energizes a second event timer 82c, which is also part of the control module 82, as illustrated in blocks 110 and 112 in FIG. 20. The second event timer 82c energizes the warning light 88 and the audible warning of horn 86 for a third predetermined period of time such as 10 seconds. Thus, it should be appreciated that the micro switch 94 cooperates with the event timer 82a, delay timer 82b and second event timer 82c to cause the second door 16 to be retained in the open position for the first predetermined period of time and to provide an audible and visual alarm while the second door 16 is being moved from the closed position to the open position. In the illustration referred to above, it should be understood that the second door 16 is initially being held in the open position for 30 seconds by the electromagnet 90. The second event timer 82c energizes at least one of the visual alarm 88 or audio alarm 86 to generate an alarm after 20 seconds, which is 10 seconds before the electromagnet 90 releases the second door 16 in the illustration being described. While the first and second predetermined periods of time referred to as 30 seconds and 20 seconds, respectively, in the illustration being described, it should be understood that these time periods could be changed, shortened or enlarged to any selected time intervals depending on various factors, such as the speed at which the door 16 closes, the size of the door, the type of goods being delivered, the type of delivery vehicle, or any number of specifications based ultimately on the wants and needs of the organization operating the delivery system.

Referring back to FIG. 20, after the warning lights 88 and audio alarm horn or speaker 86 are activated (block 114 in FIG. 20 and block 107 in FIG. 21), the door 16 closes and the electric event counter 84 is incremented by a count at the completion of the electrical pulse of the second event timer 82C (block 116). After blocks 106 and 116 are completed, one door cycle is complete.

After the first door 14 is opened and the second door 16 is moved to the open position, as shown in FIGS. 10-12, the operator may enter the entryway 20 via the ramp 120. At this point, the delivery person is in the storage compartment or area 22 and he retrieves the product, cargo or items 24 (FIG. 15) to be delivered (block 111 in FIG. 21). As is common in the industry, the operator may utilize a dolly 122 (FIG. 13) or other portable moving device in order to load and move the cargo 24 into or from the storage area 22. Notice in FIG. 14, that after the operator is in the storage area 22, the storage area 22 may be illuminated by the optional interior light (not shown) coupled to, for example, control module 82 or a motion sensor or other sensor (not shown) which activates upon the opening or closing of either the door 14 or door 16.

After the operator loads the dolly 122 with the cargo or containers 24 (FIG. 15), the operator may grasp the handle 78 (FIG. 3A) and move the door 16 in the direction of arrow E in order to move the door 16 to the open position. When the door 16 reaches the open position it again actuates switch 94 which in turn causes the control module 82 to energize the electromagnet 90 to cooperate with the door strike or target 92 to retain the door 16 in the open position. The operator may then move the dolly 122 down the ramp 120, as illustrated in FIG. 16, and exit the storage area 22 (block 115 in FIG. 21).

As mentioned earlier relative to block 107, the process proceeds at block 117 so that after the first predetermined period of time, the control module 82 ceases energizing electromagnet 90 which releases the door 16 so that it can move from the open position to the closed position, without operator involvement. As alluded to earlier, the door 16 may be biased to return to the home or closed position. Alternatively, the operator may manually or automatically (in the embodiments shown in FIGS. 4 and 5, for example) close the door 16. As also mentioned earlier, after the second predetermined period of time, which is shorter than the first predetermined period of time, the time control module 82 causes the warning horn or speaker 86 and/or the warning light 88 to be activated so that the operator is notified and warned about the release and closing (block 119 in FIG. 21) of the door 16.

Figure 17:
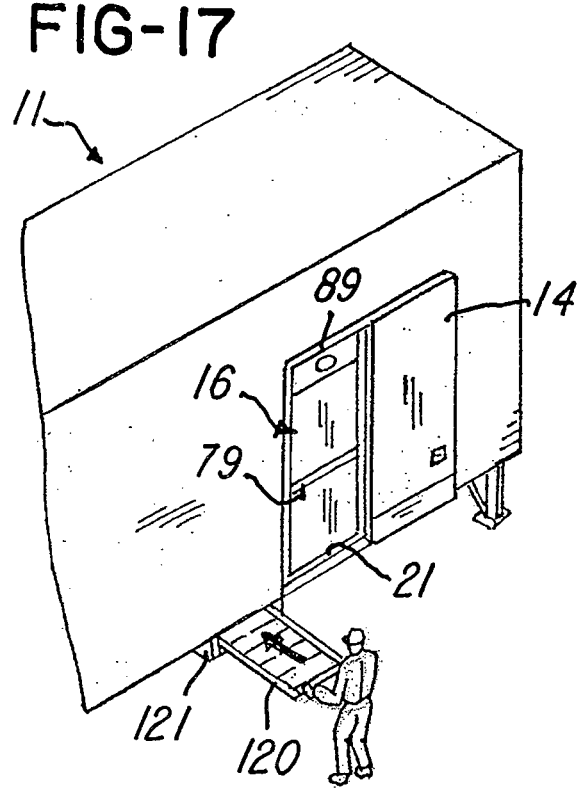
FIG. 17 is a view showing the storage compartment, the secondary door in the fully closed position and the driver returning a ramp to a storage cradle.
Figure 18:
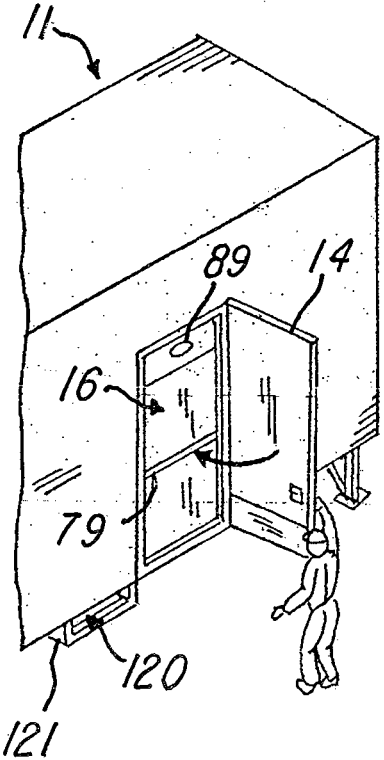
FIG. 18 is a view showing the driver closing the primary door.

After the delivery of the items or cargo 24, the ramp 120 may be removed from the threshold 21 and returned to the storage cradle 121 (FIG. 10) and stored in the stored position illustrated in FIG. 17. Thereafter, the operator may close the first door 14, as illustrated in FIG. 18.

At decision block 121 (FIG. 21) it is determined whether more product or cargo 24 have to be retrieved from storage area 22. If there is, the process loops back to block 103 (FIG. 21) as shown. If not, the driver closes the door 14 (block 123). Recall that the second door 16 closes automatically after the first predetermined period of time.

Figure 19:
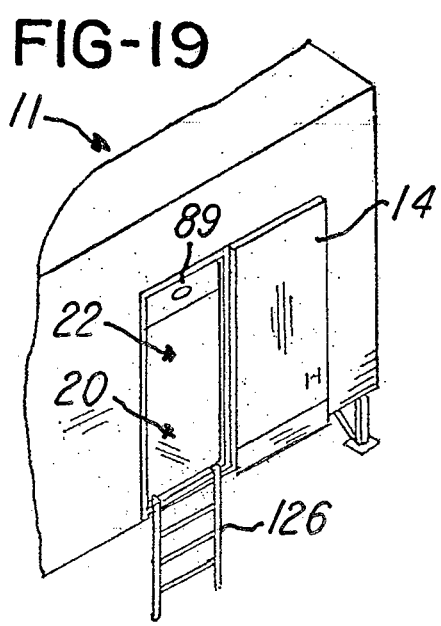
FIG. 19 is a view of another embodiment illustrating the secondary door in the open position and also showing a ladder used to access the storage compartment area.

Notice that the secondary door 16 and monitoring system 12 may also be used with a vehicle 10 or trailer 11 that has a conventional ladder 126 (FIG. 19). As alluded to earlier, the system 12 may be provided as original equipment or retrofitted to an existing vehicle 10 or trailer 11 and it could be applied to any vehicle, such as the vehicles illustrated in FIGS. 1 and 2, or a trailer, such as the trailer 11 illustrated in FIGS. 10-19. Moreover, the system 12 may further be utilized in restaurants, hospitals, warehouses, grocery stores, club stores, or anywhere where a primary door is too large and cumbersome to use at high traffic times but is still needed when the facility is closed in order to maintain optimal temperature of a compartment, cooler, freezer, or manufacturing area.

Advantageously, the system 12 and method referred to herein provide means and apparatus for controlling and maintaining the temperature in the storage area 22 within the predetermined temperature range.

The cooperation of the first door 14 with the second door 16 in the manner described herein and the operation of the second door 16 facilitate closing the entryway 20 during periods when the operator is either in the storage area 22 or outside of the storage area 22, such as when the operator is delivering the cargo to a delivery location.

Figure 22:
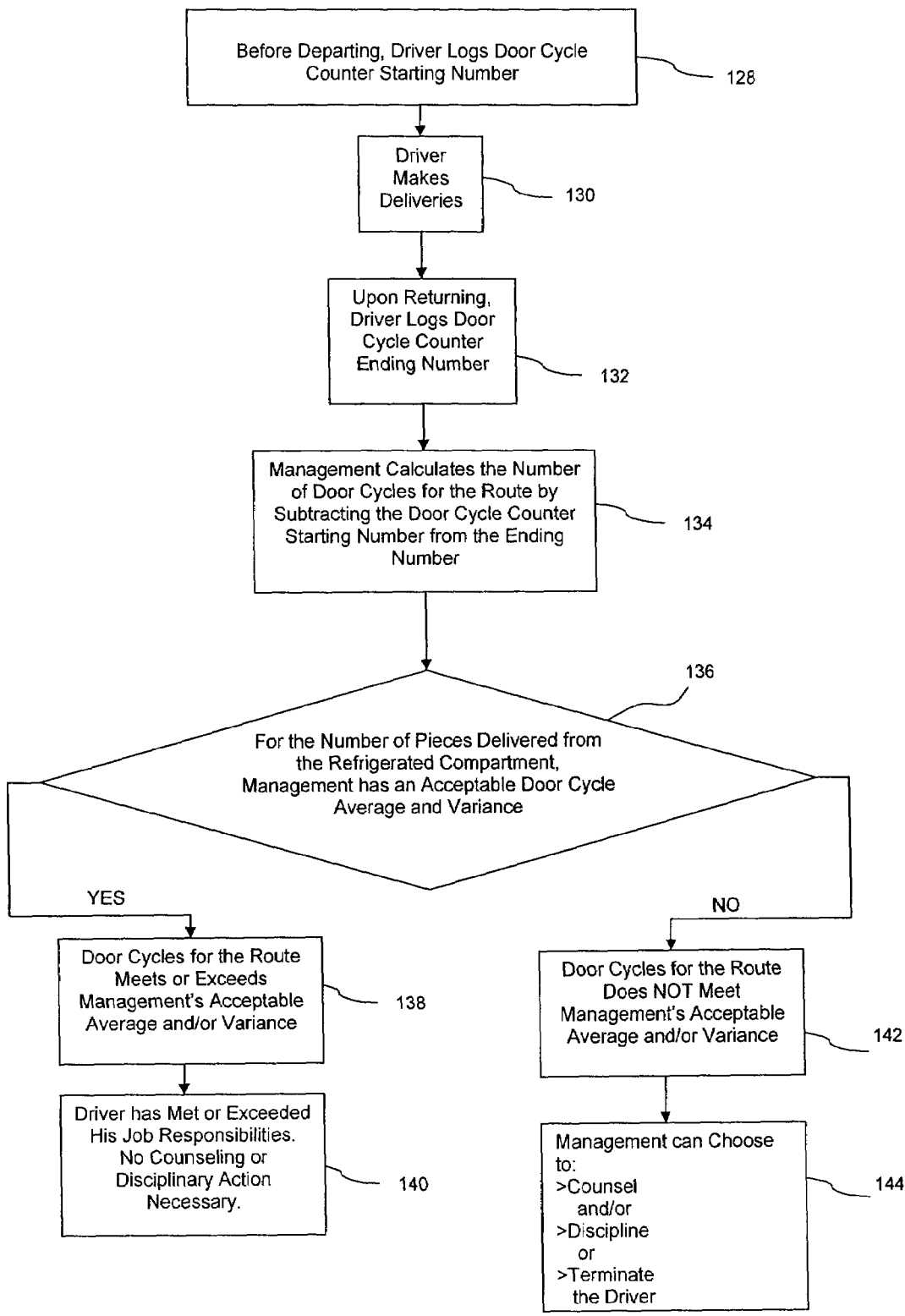
FIG. 22 is a schematic diagram of one procedure enforcing the use of the secondary door in accordance with one embodiment of the invention.

It is also envisioned that the electronic event counter 84 may provide useful information regarding the use and monitoring of the second door 16, especially by operators who may attempt to circumvent the operation and use of the second door 16 by forcing the door to be retained in the open position for longer than the first predetermined period of time. In this regard and as mentioned earlier, the time control module 82 comprises the electronic event counter 84, which provides a count of the door open-close cycles. One procedure for policing or enforcing the use of the second door 16 is illustrated in FIG. 22. The procedure begins by obtaining a door cycle count starting number from the counter 84 (block 128 in FIG. 22).

At block 130, the driver or operator makes deliveries and thereafter the door cycle counter 84 ending number is also noted, for example, when the driver returns the vehicle 10 to his workplace. At block 134, a calculation of the number of door cycles for the route driven by the driver is calculated by the difference of the door cycle counter starting number from the ending number.

Next, a calculation of the door cycle average based upon the number of pieces of cargo 24 (FIG. 15) delivered can be calculated. A determination can then be made as to whether the average is within an acceptable variance. If it is, then the routine proceeds to block 138 whereupon it is determined whether the door cycles for the route meet or exceed an acceptable average or variance. This information can be used to measure the driver's performance and provide an indication of whether the driver has met or exceeded his job responsibilities and/or whether the driver needs counseling or disciplinary action (block 140).

Alternatively, if the door cycle average does not meet the acceptable average and/or variance (block 142), then the manager can respond to the failure to meet the acceptable average and/or variance by providing counseling, discipline and/or other employment action, such as terminating the driver for failure to meet his or her job responsibilities (block 144).

In the embodiment being described, some of the parts referred to herein are as follows:

TABLE I

| Part Name | Part Number | Model No. & Manufacturer |
|---|---|---|
| support, track, screws and brackets | 30, 32, 34 and 36 | Richards-Wilcox, Inc. 600 South Lake Street |

TABLE I-continued

| Part Name | Part Number | Model No. & Manufacturer |
|---|---|---|
| electric motor | 66 | Aurora, IL 60506<br>(800) 253-5668<br>Model # 1623.00004<br>Bison Gear and Engineering Corp.<br>3850 Ohio Avenue<br>St. Charles, IL 60174<br>(630) 377-4327<br>Model # 051-203-4045 |
| actuator | 70 | EasyLift Gas Springs<br>50 West Drive<br>Melbourne, FL 32904<br>(321) 253-1999<br>Actuator Item # 14058<br>Description: A1A1F44-965-2030/100N<br>Brackets w/ fastners Item# 96002<br>Description 900BA1SB |
| time control module | 82 | MS Sedco<br>8701 Castle Park Dr.<br>Indianapolis, IN 46256<br>(800) 842-2545<br>Model # TDM |
| event timer, delay timer, and second event timer | 82a, 82b and 82c | MS Sedco<br>8701 Castle Park Dr.<br>Indianapolis, IN 46256<br>(800) 842-2545<br>Model # TDM |
| electronic event counter | 84 | Curtis Instruments, Inc.<br>World Headquarters<br>200 Kisco Avenue<br>Mt. Kisco, NY 10549<br>(914) 666-2971<br>Model # 7003<br>U.S. Pat. No. 4,712,195 |
| warning alarm, horn or speaker | 86 | Wolo Manufaturing Corp.<br>1 Saxwood St.<br>Deer Park, NY 11729<br>(631) 242-0333<br>Model # BA-52 |
| warning light | 88 | Velleman Components N.V.<br>World Headquarters<br>Legen Heirweg 33<br>B-9890 Gavere<br>Belgium<br>32(0) 9384-36-11<br>Model # HAA40R |
| electromagnet | 90 | Rixson Specialty Door Controls<br>9100 W. Belmont Ave.<br>Franklin Park, IL 60131<br>(866) 474-9766<br>Model # 996 |
| door strike or target | 92 | Rixson Specialty Door Controls<br>9100 W. Belmont Ave.<br>Franklin Park, IL 60131<br>(866) 474-9766<br>Model # 996 |
| micro switch | 94 | Unimax Switch<br>1N2 Tech Ltd.<br>Unit 2 Acan Business Development Park<br>Garrard Way<br>Teleford Way Industrial Estate<br>Kettering<br>Northhamptonshire<br>England<br>NN168NT<br>44(0) 1536 419200<br>Model # MJ2-1703 |

Although not shown, this time control module 82 may be in communication with an R:Com System (Thermo King Corporation, 314 W. 90th Street, Minneapolis, Minn. 55420), a FleetWatch System (Blue Tree Systems, 1 Galway Business Park, Dangan, Galway, Ireland) or a DataLink System (Carrier Corporation, 1 Carrier Place, Farmington, Conn. 06032.)

Advantageously, the system and method provide means, apparatus and method for controlling the operation of the second or secondary door 16, which in turn enables the predetermined temperature in the storage area 22 to be controlled within an acceptable tolerance range. This, in turn, prevents the refrigeration unit, sometimes referred to as a "reefer" from operating properly, and/or "icing" up, which is a common occurrence when the first door 16 is left open, for example, during deliveries. The system and method provide several other advantages and benefits which include:

The secondary inner door 16 can be used specifically during the delivery of frozen or refrigerated goods from the side door 14 of a refrigerated delivery vehicle 10.

The slim sliding door 16 specifically is designed to allow freight and cargo to be easily loaded into the refrigerated/frozen compartment or storage area 22.

The panel 18 is generally slender, permitting sliding action. Specifically, the design allows the door to operate no matter how full the refrigerated/frozen compartment 22 is with product 24, especially where skids of product 24 are placed partially in front of side doors. This permits sliding action specifically designed to operate no matter how full the refrigerated/frozen compartment 22 is with product 24, especially where skids of product 24 are placed partially in front of side doors. The slim sliding door 16 would operate regardless of how much product or cargo 24 (FIG. 15) is placed in the compartment.

The sliding of the door 16, even when used manually, will not slow the operator or driver down or get in his way like the conventional strip curtain made of strips of clear and flexible PVC that hang permanently in front of the side door of the truck. Although the sliding inner door 16 is not impossible to render useless by a driver, it does respect the driver's wants and needs along with those of the company for whom he works and the customers it services.

The door 16 can be made from a variety of materials including but not limited to wood, plastic, rubber, nylon, canvas, vinyl, or metal. The door 16 may or may not be made of material with insulating value. One important attribute is that the door 16 either limits or prevents air from passing into and out of the refrigerated compartment 22.

The door 16 operates on the track 32 and roller system shown in FIG. 3C.

As mentioned earlier, system 10 can be retrofitted onto any vehicle 10, truck or trailer 11 with an existing door, such as door 14, or installed as original equipment on the vehicle, truck or trailer during the manufacturing process.

If desired, the door 16 could actually be built into the wall 26 of the vehicle 10 similar to a conventional in-wall, sliding or pocket door.

Again, note that the door 16 is in the open position it will not protrude into the compartment 22 of the truck. This will help prevent damage to the door 16 during the loading process.

The door 16 saves energy and equipment wear and tear. The refrigerator or "reefer" unit does not need to run as hard or as often, and even compartment temperature is maintained throughout the delivery process, which in turn results in improved product integrity.

The door 16 can be easily operated by the driver without being a hindrance to the delivery process like the large swinging door or a safety hazard like strip curtains.

The door 16 protects perishable goods during delivery.

The door 16 enables a desired compartment temperature during delivery of perishables to be maintained.

The door 16 improves refrigerator unit efficiencies (energy consumption/mechanical wear and tear, and hours of use) of the refrigeration unit and reduces a driver's physical activities.

The door 16 provides a method for improved food safety by maintaining optimal food temperature (i.e., a "cold chain") so that from the time temperature sensitive goods are produced in their manufacturing facilities until they are ultimately purchased by consumers they must be kept within specific temperature tolerances. There are many points where goods are transfer points between the production facility and the end consumer. The act of keeping the goods within their temperature tolerance throughout the storage and delivery process is the successful completion of the cold chain.

The system 12 records driver activity to ensure proper policy and procedure.

The door 16 is ergonomically friendly and easily used.

The system 12 can be monitored and integrated into existing truck monitoring systems, such as the R-COM system or other systems available from Thermo King Corporation, Blue Tree Systems or Carrier Corporation, thereby facilitating guaranteeing proper use.

The system 12 can be retrofitted into existing refrigerated truck bodies with side delivery doors.

The system 12 can be integrated into new vehicle construction.

The door 16 can be driven by pneumatics, electrical motor, hydraulics, gravity, or even magnets.

The system 12 holds the door 16 in the open position for a set period of time, then closes automatically.

The system and method further provide:

A temperature control system for use on a vehicle having a storage compartment and at least one access door for opening and closing an entryway to the storage compartment, the temperature control system comprising:
at least one panel adapted to be mounted on the vehicle to provide a secondary door to the entryway; and
a mount for slidably mounting the at least one panel to the vehicle;
the mount enabling at least one access door to move laterally between an open position during which the entryway is open and a closed position during which the entryway is closed.

A delivery vehicle comprising:
a storage compartment defined by a plurality of walls, a floor, a ceiling and at least one access door for opening and closing an entryway to the storage compartment;
a temperature control system for controlling a temperature in the storage compartment, the temperature control system comprising:
at least one panel adapted to be mounted on the delivery vehicle to provide a secondary door to the entryway; and
a mount for slidably mounting at least one panel to the vehicle; the mount enabling at least one panel to move laterally between an open position during which the entryway is open and a closed position during which the entryway is closed.

A temperature control system for a delivery vehicle comprising:
a plurality of walls, a floor, and a ceiling that cooperate to define a storage compartment;
at least one first access door mounted to a first wall of the plurality of walls for opening and closing an entryway to the storage compartment; and
at least one second access door also mounted to the first wall and adapted to be driven between open and closed positions when the at least one first access door is open.

A time control system for controlling a storage compartment door of a vehicle having a storage compartment comprising:
a time control module;
a first switch coupled to the time control module and actuated by the storage compartment door;
an electromagnet coupled to the time control module and a target cooperating with the electromagnet to retain the storage compartment door in an open position for a predetermined time in response to the time control module; and
a warning system for generating an alarm when the storage compartment door is about to move from the open position to a closed position;
the time control module receiving a signal from the first switch and energizing the electromagnet in response thereto to retain the storage compartment door in the open position, and further causing the warning system to generate at least one alarm indicating movement of the storage compartment door from the open position to the closed position.

Advantageously, the described embodiments provide multiple modes of operation, depending on the embodiment, while achieving one or more of the advantages mentioned above. For example, during manual operation:

The door 16 can be opened manually without assistance. The door 16 is manually pushed open and pulled closed with the handles 78 (FIG. 3A) and 80 (FIG. 10) or nylon loop during unloading process.

The door 16 can be operated manually with counterweight 46 (FIG. 3A) closing:
The door 16 is still manually opened, but only a slight pull to release door 16 will allow counterweight 46 (FIG. 3C) to self-close the door 16. Alternatively, or even with the counterweight 46, the support 30 may be inclined at the slight angle $\Theta$ to the pitch of the mounting rail or track 32. The combination of gravity and counterweight 46 will close the door 16 once put in motion by the driver.

As mentioned earlier, the door 16 could be provided without counterweight 46 (FIG. 3A) or gravity assist (FIG. 6) if desired. However, it may be convenient to have such assist, especially if the door 16 is heavy or accessed frequently.

During electric automatic operation, for example, as in the embodiment shown in FIGS. 4 and 8:
These embodiments also enjoy one or more of the advantages referred to earlier as the manually operated door 16.
As described earlier, the door 16 is automatically opened and closed using the electric switch or control 68 (FIG. 4), which may be pull cord (not shown) located on the inside of the truck or a sensor 71 such as a motion sensor (not shown). The electric motor 66 would operate the door 16 using electricity supplied by the alternator (not shown) or battery (not shown) of the vehicle 10 or trailer. Note that in the embodiment shown in FIG. 3A, the door 16 automatically closes after the first predetermined period of time.

The door 16 may be reopened by driver using another easily accessible push button mechanism or switch or sensor 125 coupled to control 68 located on the outside of the truck body. At least one or a plurality of motion sensors (not shown) similar to those commonly used at the entrance of a grocery store may be used. The above operation could also be achieved using a remote control switch (not shown) similar to a remote garage door opener or car open/close/alarm clicker.

These embodiments facilitate providing reliable thermal efficiency, improved product integrity and improved delivery efficiency through automatic operation.

During pneumatic or hydraulic operation as in the embodiment shown in FIGS. 5 and 9:

Same advantages as manual, manual with assist and electric automatic operation above, except that the door is pneumatically or hydraulically operated door instead of electrically operated motor referred to earlier.

As mentioned earlier, the pneumatic or hydraulic operation may be coupled to and created through compressed air supply or hydraulic system (not shown) located on the vehicle 10, such as the pneumatic braking system (not shown) that works the vehicle's brakes.

The automatic open and close capability facilitates guaranteeing improved delivery efficiency.

While the process and product herein described constitute preferred embodiments of this invention, it is to be understood that the invention is not limited to this precise process and product, and that changes may be made therein without departing from the scope of the invention which is defined in the appended claims.

What is claimed is:

1. A secondary delivery door system for mounting on a vehicle or trailer having a storage compartment; said secondary delivery door system comprising:
   a first door mounted to a wall of the vehicle or trailer, said wall having a first entry therein and said first door adapted to open and close said first entry to said storage compartment;
   a secondary door mounted to said wall in opposed relationship to said first door and also adapted to open and close said first entry to said storage compartment, said secondary door comprising a body member;
   at least one fastener for moveably attaching a body member to said wall of said vehicle or trailer in operative relationship with said first door;
   said at least one fastener comprising a closer coupled to said body member for automatically driving said body member
   from a closed position to an open position during which said user may pass by both said first door and said secondary door and through said first entry either into or out of said storage compartment and from said open position to
   said closed position when said first door is open and said user is not passing through said first entry; thereby maintaining a temperature in said storage compartment within a predetermined temperature range.

2. The secondary delivery door system as recited in claim 1 wherein said at least one fastener further comprises:
   a driver for mounting in said storage compartment for driving said body member between said closed position and said open position.

3. The secondary delivery door system as recited in claim 2 wherein said driver comprises:
   a drive motor mounted in said storage compartment, and drive linkage coupling said drive motor to said body member.

4. The secondary delivery door system as recited in claim 3 wherein said drive motor comprises a pneumatic motor, an electrical motor, a hydraulic motor, electromagnet and target, or a gravity or counterweight driver.

5. The secondary delivery door system as recited in claim 2 wherein said closed position is in a laterally-spaced and generally horizontal relation to said open position,
   said at least one fastener enabling said body member to be driven generally horizontally between said closed position and said open position.

6. The secondary delivery door system as recited in claim 1 wherein said system further comprises:
   a monitoring system for monitoring a vehicle or trailer delivery driver's use or operation of said body member.

7. The secondary delivery door system as recited in claim 6 wherein said monitoring system further comprises:
   at least one electrical pulse counter for providing a count of a number of times said body member has been moved to said open position while said first entry is open.

8. The secondary delivery door system as recited in claim 1 wherein said system further comprises:
   at least one latch for retaining said body member in said open position for a predetermined period of time.

9. The secondary delivery door system as recited in claim 8 wherein said at least one latch comprises an electromagnetic latch.

10. The secondary delivery door system as recited in claim 1 wherein said at least one fastener further comprises:
    a closer for automatically driving said body member to block or cover said first entry.

11. The secondary delivery door system as recited in claim 10 wherein said closer biases said body member in said closed position during which said body member substantially blocks or covers said first entry.

12. The secondary delivery door system as recited in claim 1 wherein said at least one fastener mounts said body member to an interior wall of said vehicle for delivering perishables whose temperature must be maintained below a predetermined level.

13. The secondary delivery door system as recited in claim 1 wherein said system further comprises:
    an indicator for providing an indication of a movement of said body member between said closed position during which said body member covers or closes said first entry and said open position.

14. The secondary delivery door system as recited in claim 13 wherein said indicator comprises:
    an alarm for providing an alarm of when said body member is about to be moved to said closed position.

15. The secondary delivery door system as recited in claim 1 wherein said at least one fastener further comprises:
    a track mounted to a wall of said vehicle or trailer above said first door;
    a plurality of wheels mounted to a top portion of said body member and received in said track for permitting said body member to move laterally toward and away from said first entry.

16. The secondary delivery door system as recited in claim 15 wherein said track comprises a first end and a second end, said first end being situated a first predetermined distance from a floor of said storage compartment, and said second end being situated a second predetermined distance from said floor of said storage compartment, said first predetermined distance being larger than said second predetermined distance in order to cause said body member to be urged by gravity to said closed position.

17. The secondary delivery door system as recited in claim 1, wherein said body member is secured to a wall of said vehicle or trailer to which said first door is secured.

18. The secondary delivery door system as recited in claim 1, wherein said secondary door moves generally parallel to a wall of said first door wherein said first door is mounted to said wall.

19. A secondary delivery door system for mounting on a vehicle or trailer having a storage compartment, said secondary delivery door system comprising:

a first door mounted to a wall of the vehicle or trailer, said wall having a first entry therein and said first door opening and closing said first entry to said storage compartment:

a movable barrier mounted to said wall in opposed relationship to said first door, said moveable barrier also opening and closing said first entry to said storage compartment;

at least one fastener for moveably attaching said movable barrier to said wall of said vehicle or trailer in operative relationship with said first door so that when said first door is opened, said movable barrier may at least partially close said first entry, thereby facilitating maintaining a temperature in said storage compartment within a predetermined temperature range;

said at least one fastener comprising a closer coupled to said movable barrier for automatically driving said movable barrier from a closed position to an open position during which a user may pass by both said first door and said movable barrier and through said first entry either into or out of said storage compartment and from said open position to said closed position when said first door is open and said user is not passing through said first entry, thereby maintaining said temperature in said storage compartment within said predetermined temperature range.

20. The secondary delivery door system as recited in claim 19 wherein said at least one fastener further comprises:

a driver for mounting in said storage compartment for driving said movable barrier between said closed position and a said open position.

21. The secondary delivery door system as recited in claim 20 wherein said driver comprises:

a drive motor mounted in said storage compartment, and drive linkage coupling said drive motor to said movable barrier.

22. The secondary delivery door system as recited in claim 20 wherein said driver comprises a pneumatic motor, an electrical motor, a hydraulic motor, electro-magnet and target, or a gravity or counterweight driver.

23. The secondary delivery door system as recited in claim 20 wherein said closed position is in a laterally-spaced and generally horizontal relation to said open position, said at least one fastener enabling said movable barrier to be driven generally horizontally between said closed position and said open position.

24. The secondary delivery door system as recited in claim 19 wherein said system further comprises:

a monitoring system for monitoring a vehicle or trailer delivery driver's use or operation of said movable barrier.

25. The secondary delivery door system as recited in claim 24 wherein said monitoring system further comprises:

at least one electrical pulse counter for providing a count of a number of times said movable barrier has been moved to said open position while said first entry is open.

26. The secondary delivery door system as recited in claim 19 wherein said system further comprises:

at least one latch for retaining said movable barrier in said open position for a predetermined period of time.

27. The secondary delivery door system as recited in claim 26 wherein said at least one latch comprises an electromagnetic latch.

28. The secondary delivery door system as recited in claim 19 wherein said at least one fastener further comprises:

a closer for automatically driving said movable barrier to block or cover said first entry.

29. The secondary delivery door system as recited in claim 28 wherein said closer biases said movable barrier in said closed position during which said movable barrier substantially blocks or covers said first entry.

30. The secondary delivery door system as recited in claim 19 wherein said at least one fastener mounts said movable barrier to an interior wall of said vehicle for delivering perishables whose temperature must be maintained below a predetermined level.

31. The secondary delivery door system as recited in claim 19 wherein said system further comprises:

an indicator for providing an indication of a movement of said movable barrier between said closed position during which said movable barrier covers or closes said first entry and said open position.

32. The secondary delivery door system as recited in claim 31 wherein said indicator comprises:

an alarm for providing an alarm of when said movable barrier is about to be moved to said closed position.

33. The secondary delivery door system as recited in claim 19 wherein said at least one fastener further comprises:

a track mounted to a wall of said vehicle or trailer above said first door;

a plurality of wheels mounted to a top portion of said movable barrier and received in said track for permitting said movable barrier to move laterally toward and away from said closed entry.

34. The secondary delivery door system as recited in claim 33 wherein said track comprises a first end and a second end, said first end being situated a first predetermined distance from a floor of said storage compartment, and said second end being situated a second predetermined distance from said floor of said storage compartment, said first predetermined distance being larger than said second predetermined distance in order to cause said movable barrier to be urged by gravity to said first position.

35. The secondary delivery door system as recited in claim 19, wherein said movable barrier is secured to a wall of said vehicle or trailer to which said first door is secured.

36. The secondary delivery door system as recited in claim 19, wherein said secondary door moves generally parallel to a wall of said first door wherein said first door is mounted to said wall.

37. A closure system for facilitating maintaining a temperature in a storage area of a delivery vehicle or trailer within a predetermined temperature range, said closure system comprising:

a first barrier mounted to a wall of said vehicle or trailer, said wall having a first entry therein and said first barrier for opening and closing said entryway into said storage area; and a movable second barrier mounted to said wall and situated in operative relation to said first barrier for closing said entryway during at least one period when said first barrier is open;

a closer coupled to said movable second barrier for driving said movable second barrier to block or cover said entryway when said first barrier is open and a user is not passing through said first entry.

38. The closure system as recited in claim 37 wherein said first barrier and said movable second barrier are mounted to a common surface in said vehicle.

39. The closure system as recited in claim 38 wherein said common surface is a wall of said vehicle.

40. The closure system as recited in claim 37 wherein said first barrier is a pivoted door and said movable second barrier is at least one sliding door.

41. The closure system as recited in 40 wherein said first barrier and said movable second barrier are mounted to a common surface in said vehicle.

* * * * *